(12) United States Patent
Li et al.

(10) Patent No.: US 12,412,243 B2
(45) Date of Patent: Sep. 9, 2025

(54) IMAGE PROCESSING METHOD AND APPARATUS

(71) Applicant: HUAWEI TECHNOLOGIES CO., LTD., Guangdong (CN)

(72) Inventors: Songjiang Li, Beijing (CN); Takashi Isobe, Shenzhen (CN); Xu Jia, Shenzhen (CN); Qi Tian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 334 days.

(21) Appl. No.: 18/161,123

(22) Filed: Jan. 30, 2023

(65) Prior Publication Data
US 2023/0177646 A1 Jun. 8, 2023

Related U.S. Application Data

(63) Continuation of application No. PCT/CN2021/106380, filed on Jul. 15, 2021.

(30) Foreign Application Priority Data

Jul. 31, 2020 (CN) .......................... 202010762144.6

(51) Int. Cl.
*G06T 3/4053* (2024.01)
*G06T 3/40* (2024.01)
(Continued)

(52) U.S. Cl.
CPC .............. *G06T 3/4053* (2013.01); *G06T 3/40* (2013.01); *G06T 3/4038* (2013.01); *G06T 5/60* (2024.01);
(Continued)

(58) Field of Classification Search
CPC ....... G06T 3/4053; G06T 3/4046; G06T 7/00; G06T 7/10; G06T 3/4061; G06T 3/4076;
(Continued)

(56) References Cited

U.S. PATENT DOCUMENTS 8,571,355 B2  10/2013  Lee et al.
2005/0069207 A1 *  3/2005  Zakrzewski ........... G06V 20/52
                                                    382/218

FOREIGN PATENT DOCUMENTS

CN     105718906 A  *  6/2016  ............. G06V 40/45
CN     106204447 A  *  12/2016  ............ G06T 3/4046
(Continued)

OTHER PUBLICATIONS

Search machine translation of CN 112070664 A to Song-jiang Li et al., , Image Processing Method And Device, translated Feb. 21, 2025, 27 pages. (Year: 2025).*

(Continued)

*Primary Examiner* — Henok Shiferaw
*Assistant Examiner* — Dennis Rosario

(57) ABSTRACT

An image processing method and apparatus in the field of artificial intelligence are disclosed. The method comprises: decomposing a first image to obtain a first structure sub-image and a first detail sub-image, where the first image is any frame of image in video data other than a first frame; fusing first hidden state information and the first structure sub-image to obtain a second structure sub-image, and splicing the first hidden state information and the first detail sub-image to obtain a second detail sub-image; performing feature extraction based on the second structure sub-image and the second detail sub-image to obtain a structure feature and a detail feature; and obtaining an output image based on
(Continued)

the structure feature and the detail feature, where a resolution of the output image is higher than a resolution of the first image.

20 Claims, 18 Drawing Sheets

(51) Int. Cl.
*G06T 3/4038* (2024.01)
*G06T 5/60* (2024.01)
*G06V 10/40* (2022.01)
*G06V 10/46* (2022.01)
*G06V 10/74* (2022.01)
*G06V 10/77* (2022.01)
*G06V 10/80* (2022.01)
*G06V 10/82* (2022.01)
*G06V 40/18* (2022.01)
*H04N 1/32* (2006.01)
*H04N 19/169* (2014.01)
*H04N 19/63* (2014.01)

(52) U.S. Cl.
CPC ............ *G06V 10/40* (2022.01); *G06V 10/46* (2022.01); *G06V 10/761* (2022.01); *G06V 10/7715* (2022.01); *G06V 10/80* (2022.01); *G06V 10/806* (2022.01); *G06V 10/82* (2022.01); *G06V 40/193* (2022.01); *H04N 1/3217* (2013.01); *H04N 19/1883* (2014.11); *H04N 19/63* (2014.11); *G06T 2207/10016* (2013.01); *G06T 2207/20016* (2013.01); *G06T 2207/20064* (2013.01); *G06T 2207/20212* (2013.01); *G06T 2207/20221* (2013.01)

(58) Field of Classification Search
CPC ......... G06T 3/4069; G06T 2207/20221; G06T 2207/20212; G06T 7/194; G06T 7/11; G06T 2207/20084; G06T 5/50; G06T 2207/20064; G06T 2207/20016; G06T 2207/10016; G06T 3/4038; G06T 5/60; G06T 3/40; G06V 10/761; G06V 10/7715; G06V 10/80; G06V 10/806; G06V 40/168; G06V 40/171; G06V 40/169; G06V 10/26; G06V 10/40; G06V 10/42; G06V 10/431; G06V 20/46; G06V 10/82; G06V 40/193; G06V 10/44; H04N 19/63; H04N 19/1883; H04N 1/3217; G06N 3/02

See application file for complete search history.

(56) References Cited

FOREIGN PATENT DOCUMENTS

CN 112070664 A * 12/2020 .......... G06T 3/4046
CN 116452419 A * 7/2023

OTHER PUBLICATIONS

Search machine translation of CN 116452419 A to Ding, Bidirectional Cyclic Neural Network Super-resolution Method Based On Structure-detail Separation, translated Feb. 21, 2025, 12 pages. (Year: 2025).*
Isobe et al., Look Back and Forth: Video Super-Resolution with Explicit Temporal Difference Modeling, Apr. 14, 2022 [retrieved Feb. 21, 2025], Cornell University:arXiv, version: [v1], 10 pages. https://doi.org/10.48550/arXiv.2204.07114 (Year: 2022).*
Wang et al., A Hyperspectral Image NSST-HMF Model and Its Application in HS-Pansharpening, Feb. 3, 2020 (1st made public) [retrieved Jun. 6, 2025], IEEE Transactions on Geoscience and Remote Sensing, vol. 58, Issue: 7, Jul. 2020, pp. 4803-4817. DOI: 10.1109/TGRS.2020.2967549 (Year: 2020).*
Search machine translation of CN-105718906-A to Yan, Living Body Human Face Detecting Method Based On SVD-HMM, translated Jun. 6, 2025, 10 pages. (Year: 2025).*
Search machine translation of CN-106204447-A to Jia, Super-resolution Reconstruction Method Based On Total Variable Difference And Convolutional Neural Network, translated Jun. 6, 2025, 9 pages. (Year: 2025).*
Takashi Isobe et al:"VideoSuper-Resolution with Recurrent Structure-Detail Network", Arxiv.Org, Cornell University Library, 201 Olin Library Cornell University Ithaca, NY Aug. 12, 2020 (Aug. 2, 2020), XP081730606, total 16 pages.
Extended European Search Report issued in EP21850081.7, dated Dec. 12, 2023, 11 pages.
International Search Report and Written Opinion issued in PCT/CN2021/106380, dated Oct. 14, 2021, 12 pages.

* cited by examiner

IMAGE PROCESSING METHOD AND APPARATUS

CROSS-REFERENCE TO RELATED APPLICATIONS

This disclosure is a continuation of International Application No. PCT/CN2021/106380, filed on Jul. 15, 2021, which claims priority to Chinese Patent Application No. 202010762144.6, filed on Jul. 31, 2020. The disclosures of the aforementioned applications are hereby incorporated by reference in their entireties.

TECHNICAL FIELD

This disclosure relates to the field of artificial intelligence, and in particular, to an image processing method and apparatus.

BACKGROUND

Super-resolution (SR) refers to reconstructing a corresponding high-resolution image from an observed low-resolution image. The low-resolution image is upsampled and amplified, and details are filled by using image priori knowledge, image self-similarity, and multi-frame image complementary information, to generate the corresponding high-resolution image. A super-resolution technology has important application value in fields such as HDTV, observation devices, satellite images, and medical imaging.

In an existing solution, when the resolution of an intermediate frame is improved, the intermediate frame and 2N adjacent frames before and after the intermediate frame are input to form an input frame sequence of 2N+1 frames, then motion compensation is performed on the input frame sequence, the adjacent frames are aligned to the intermediate frame, multi-frame information is fused, and finally super-resolution output of the intermediate frame is implemented. However, in this solution, the N adjacent frames need to be temporarily stored first, resulting in a delay of the N frames. When a real-time application such as a video stream is processed, an obvious delay occurs, and user experience is reduced. In addition, feature extraction needs to be performed on the 2N+1 frames at the same time, and a required feature extraction network is complex.

SUMMARY

This disclosure provides an image processing method and apparatus, to perform super-resolution processing on an input image, so as to efficiently and accurately obtain a higher-definition image.

In view of this, a first aspect of this disclosure provides an image processing method. The method includes: decomposing a first image to obtain a first structure sub-image and a first detail sub-image, where the first image is any frame of image in video data other than a first frame, a first frequency is lower than a second frequency, the first frequency is a frequency of information included in the first structure sub-image, and the second frequency is a frequency of information included in the first detail sub-image, in other words, the frequency of the information included in the first structure sub-image is higher than the frequency of the information included in the first detail sub-image; fusing first hidden state information and the first structure sub-image to obtain a second structure sub-image, and splicing the first hidden state information and the first detail sub-image to obtain a second detail sub-image, where the first hidden state information includes a feature extracted from a second image, and the second image includes at least one frame of image in the video data adjacent to the first image; performing feature extraction based on the second structure sub-image and the second detail sub-image, to obtain a structure feature and a detail feature; and obtaining an output image based on the structure feature and the detail feature, where a resolution of the output image is higher than a resolution of the first image.

Therefore, in this implementation, in a process of performing super-resolution processing of the video data, a structure branch and a detail branch are decomposed for processing, and a structure and a detail are further enriched by using hidden state information, so that a structure and a detail of a finally obtained output image are more enriched. A high-resolution image of a current frame can be efficiently obtained without buffering a plurality of frames to process an intermediate frame.

In a possible implementation, fusing the first hidden state information and the first structure sub-image to obtain a second structure sub-image, and splicing the first hidden state information and the first detail sub-image to obtain a second detail sub-image may include: obtaining a similarity matrix between the first hidden state information and the first image, where the similarity matrix includes at least one similarity, and the at least one similarity indicates a similarity between an image region included in the first hidden state information and an image region in the first image; filtering the first hidden state information based on the similarity matrix to obtain second hidden state information, where a similarity between each image region in the second hidden state information and a corresponding image region in the first image is higher than a similarity between each image region in the first hidden state information and the image region in the first image; and splicing the first structure sub-image by using the second hidden state information to obtain the second structure sub-image, and splicing the first detail sub-image by using the second hidden state information to obtain the second detail sub-image.

Therefore, in this implementation, when the first hidden state information is used, redundant information in the first hidden state information may be filtered, and the first structure sub-image and the first detail sub-image are separately fused by using the filtered hidden state information, so that a second structure sub-image with a richer detail and a second structure sub-image with a richer structure can be obtained.

In a possible implementation, the performing feature extraction based on the second structure sub-image and the second detail sub-image to obtain a structure feature and a detail feature may include: performing iterative fusion on the second structure sub-image and the second detail sub-image for at least one time to obtain an updated second structure sub-image and an updated second detail sub-image; and extracting a feature from the updated second structure sub-image to obtain the structure feature, and extracting a feature from the updated second detail sub-image to obtain the detail feature.

Therefore, in this implementation, information included in the second structure sub-image and the second detail sub-image may be fused, to enrich detail information of the second detail sub-image by using structure information included in the second structure sub-image, and enrich the structure information included in the second structure sub-image by using the detail information included in the second detail sub-image, so that finally extracted features are more abundant, and a finally obtained output image is clearer, thereby improving user experience.

In a possible implementation, any one iterative fusion process includes: performing fusion on a second structure sub-image obtained in previous iteration and a second detail sub-image obtained in the previous iteration, to obtain a first fused image of current iteration; performing fusion on the first fused image and the second structure sub-image obtained in the previous iteration, to obtain a second structure sub-image of the current iteration; and performing fusion on the first fused image and the second detail sub-image obtained in the previous iteration, to obtain a second detail sub-image of the current iteration.

Therefore, in this implementation, in each iterative fusion process, the second structure sub-image obtained in the previous iteration and the second detail sub-image obtained in the previous iteration may be fused, and the second structure sub-image and the second detail sub-image are fused separately by using the first fused image obtained through fusion, to enrich the detail information of the second detail sub-image by using the structure information included in the second structure sub-image, and enrich the structure information included in the second structure sub-image by using the detail information included in the second detail sub-image, so that the finally extracted features are enriched, and the finally obtained output image is clearer, thereby improving user experience.

In a possible implementation, the obtaining an output image based on the structure feature and the detail feature may include: fusing the structure feature and the detail feature to obtain a second fused image; and performing amplification processing on the second fused image to obtain the output image, where the resolution of the output image is higher than resolution of the second fused image.

Therefore, in this implementation, the second fused image may be amplified to obtain the output image, so as to obtain an output image with higher resolution.

In a possible implementation, after the extracting a feature from the second structure sub-image to obtain the structure feature, and extracting a feature from the second detail sub-image to obtain the detail feature, the method further includes: updating the first hidden state information based on the structure feature and the detail feature, where the first hidden state information is used to process a next frame of image that is in the video data and that is arranged in the first image.

Therefore, in this implementation, after super-resolution processing is performed on the current frame, the first hidden state information may be updated, so that in a process of processing a next frame, updated first hidden state information may be used for processing, thereby improving a clear image of an output image corresponding to the next frame, and improving user experience.

In a possible implementation, the decomposing a first image may include: performing downsampling on the first image to obtain a downsampled image; performing upsampling on the downsampled image to obtain the first structure sub-image; and removing the first structure sub-image from the first image to obtain the first detail sub-image.

Therefore, in this implementation, the first structure sub-image and the first detail sub-image may be obtained through downsampling and upsampling, and a specific manner of obtaining the first structure sub-image and the first detail sub-image is provided.

According to a second aspect, this disclosure provides an image processing apparatus. The apparatus includes:

a decomposition unit, configured to decompose a first image to obtain a first structure sub-image and a first detail sub-image, where the first image is any frame of image in video data other than a first frame, a first frequency is lower than a second frequency, the first frequency is a frequency of information included in the first structure sub-image, and the second frequency is a frequency of information included in the first detail sub-image;

a fusion unit, configured to: fuse first hidden state information and the first structure sub-image to obtain a second structure sub-image, and splice the first hidden state information and the first detail sub-image to obtain a second detail sub-image, where the first hidden state information includes a feature extracted from a second image, and the second image includes at least one frame of image in the video data adjacent to the first image;

a feature extraction unit, configured to perform feature extraction based on the second structure sub-image and the second detail sub-image to obtain a structure feature and a detail feature; and an output unit, configured to obtain an output image based on the structure feature and the detail feature, where a resolution of the output image is higher than a resolution of the first image.

In a possible implementation, the fusion unit is specifically configured to: obtain a similarity matrix between the first hidden state information and the first image, where the similarity matrix includes at least one similarity, and the at least one similarity indicates a similarity between an image region included in the first hidden state information and an image region in the first image; filter the first hidden state information based on the similarity matrix to obtain second hidden state information, where a similarity between each image region in the second hidden state information and a corresponding image region in the first image is higher than a similarity between each image region in the first hidden state information and the image region in the first image; and splice the first structure sub-image by using the second hidden state information to obtain the second structure sub-image, and splice the first detail sub-image by using the second hidden state information to obtain the second detail sub-image.

In a possible implementation, the feature extraction unit is configured to: perform iterative fusion on the second structure sub-image and the second detail sub-image for at least one time to obtain an updated second structure sub-image and an updated second detail sub-image; and extract a feature from the updated second structure sub-image to obtain the structure feature, and extract a feature from the updated second detail sub-image to obtain the detail feature.

In a possible implementation, any iterative fusion process may include: performing fusion on a second structure sub-image obtained in previous iteration and a second detail sub-image obtained in the previous iteration, to obtain a first fused image of current iteration; performing fusion on the first fused image and the second structure sub-image obtained in the previous iteration, to obtain a second structure sub-image of the current iteration; and performing fusion on the first fused image and the second detail sub-image obtained in the previous iteration, to obtain a second detail sub-image of the current iteration.

In a possible implementation, the output unit is specifically configured to: fuse the structure feature and the detail feature to obtain a second fused image; and perform amplification processing on the second fused image to obtain the output image, where the resolution of the output image is higher than the resolution of the second fused image.

In a possible implementation, the image processing apparatus may further include an updating unit, configured to update the first hidden state information based on the structure feature and the detail feature, where the first hidden state information is used to process a next frame of image that is in the video data and that is arranged in the first image.

In a possible implementation, the decomposition unit is specifically configured to: perform downsampling on the first image to obtain a downsampled image; perform upsampling on the downsampled image to obtain the first structure sub-image; and remove the first structure sub-image from the first image to obtain the first detail sub-image.

According to a third aspect, an embodiment of this disclosure provides an image processing apparatus. The image processing apparatus has a function of implementing the image processing method in the first aspect. The function may be implemented by hardware, or may be implemented by hardware executing corresponding software. The hardware or the software includes one or more modules corresponding to the function.

According to a fourth aspect, an embodiment of this disclosure provides an image processing apparatus, including a processor and a memory. The processor and the memory are interconnected through a line, and the processor invokes program code in the memory to perform a processing-related function in the image processing method shown in any one of the first aspect. Optionally, the image processing apparatus may be a chip.

According to a fifth aspect, an embodiment of this disclosure provides an image processing apparatus. The image processing apparatus may also be referred to as a digital processing chip or a chip. The chip includes a processing unit and a communication interface. The processing unit obtains program instructions through the communication interface, and the program instructions are executed by the processing unit. The processing unit is configured to perform a processing-related function in any one of the first aspect or the optional implementations of the first aspect.

According to a sixth aspect, an embodiment of this disclosure provides a computer-readable storage medium, including instructions. When the instructions are run on a computer, the computer is enabled to perform the method in any one of the first aspect or the optional implementations of the first aspect.

According to a seventh aspect, an embodiment of this disclosure provides a computer program product including instructions. When the computer program product runs on a computer, the computer is enabled to perform the method in any one of the first aspect or the optional implementations of the first aspect.

DESCRIPTION OF EMBODIMENTS

The following describes technical solutions in embodiments of this disclosure with reference to accompanying drawings in embodiments of this disclosure. It is clear that the described embodiments are merely a part rather than all of embodiments of this disclosure. All other embodiments obtained by a person of ordinary skill in the art based on embodiments of this disclosure without creative efforts shall fall within the protection scope of this disclosure.

An image processing method provided in this disclosure may be applied to an artificial intelligence (AI) scenario. AI is a theory, a method, a technology, or an application system that simulates, extends, and expands human intelligence by using a digital computer or a machine controlled by a digital computer, to perceive an environment, obtain knowledge, and achieve an optimal result by using the knowledge. In other words, artificial intelligence is a branch of computer science, and is intended to understand the essence of intelligence and produce a new intelligent machine that can react in a manner similar to human intelligence. Artificial intelligence is to study design principles and implementation methods of various intelligent machines, so that the machines have perception, inference, and decision-making functions. Research in the field of artificial intelligence includes robotics, natural language processing, computer vision, decision-making and inference, human-computer interaction, recommendation and search, an AI basic theory, and the like.

Figure 1:
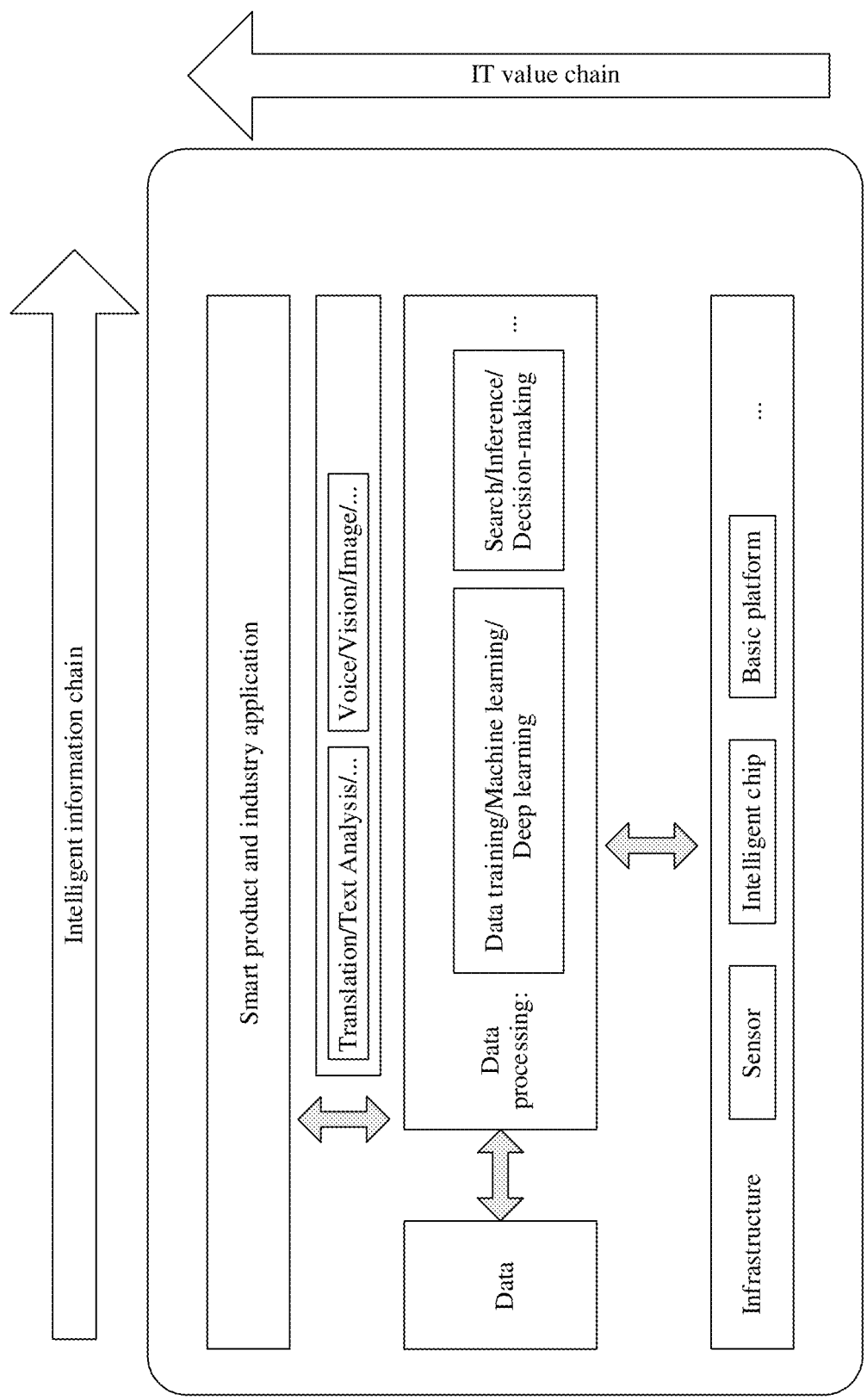
FIG. 1 is a schematic diagram of an artificial intelligence main framework applied to this disclosure.

FIG. 1 is a schematic diagram of an artificial intelligence main framework. The main framework describes an overall working procedure of an artificial intelligence system, and is applicable to a requirement of a general artificial intelligence field.

The following describes the artificial intelligence main framework from two dimensions: an "intelligent information chain" (a horizontal axis) and an "IT value chain" (a vertical axis).

The "intelligent information chain" reflects a series of processes from obtaining data to processing the data. For example, the process may be a general process of intelligent information perception, intelligent information representation and formation, intelligent inference, intelligent decision-making, and intelligent execution and output. In this process, the data undergoes a refinement process of "data-information-knowledge-intelligence".

The "IT value chain" reflects a value brought by artificial intelligence to the information technology industry from an underlying infrastructure and information (technology providing and processing implementation) of human intelligence to an industrial ecological process of a system.

(1) Infrastructure

The infrastructure provides computing capability support for the artificial intelligence system, implements communication with the external world, and implements support by using a basic platform. The infrastructure communicates with the outside by using a sensor. A computing capability is provided by an intelligent chip, for example, a hardware acceleration chip such as a central processing unit (CPU), a network processing unit (NPU), a graphics processing unit (GPU), an application-specific integrated circuit (ASIC), or a field programmable gate array (FPGA). The basic platform includes related platforms, for example, a distributed computing framework and a network, for assurance and support, and may include cloud storage and computing, an interconnection network, and the like. For example, the sensor communicates with the outside to obtain data, and the data is provided to a smart chip in a distributed computing system provided by the basic platform for computing.

(2) Data

Data at an upper layer of the infrastructure indicates a data source in the field of artificial intelligence. The data relates to a graph, an image, a voice, a video, and text, further relates to internet of things data of a conventional device, and includes service data of an existing system and perception data such as force, displacement, a liquid level, a temperature, and humidity.

(3) Data Processing

Data processing usually includes a manner such as data training, machine learning, deep learning, searching, inference, or decision-making.

Machine learning and deep learning may mean performing symbolic and formalized intelligent information modeling, extraction, preprocessing, training, and the like on data.

Inference is a process in which a human intelligent inference manner is simulated in a computer or an intelligent system, and machine thinking and problem resolving are performed by using formal information according to an inference control policy. A typical function is searching and matching.

Decision-making is a process in which a decision is made after intelligent information is inferred, and usually provides functions such as classification, ranking, and prediction.

(4) General Capability

After data processing mentioned above is performed on data, some general capabilities may be further formed based on a data processing result, for example, an algorithm or a general system, such as translation, text analysis, computer vision processing (such as image recognition and object detection), and speech recognition.

(5) Smart Product and Industry Application

The smart product and the industry application are a product and an application of the artificial intelligence system in various fields, and are package of an overall solution of the artificial intelligence, so that decision-making for intelligent information is productized and an application is implemented. Application fields mainly include smart manufacturing, smart transportation, smart home, smart health care, smart security protection, autonomous driving, a safe city, a smart terminal, and the like.

Embodiments of this disclosure relate to a large quantity of applications related to a neural network. To better understand the solutions of embodiments of this disclosure, the following first describes related terms and concepts of the neural network that may be mentioned in embodiments of this disclosure.

(1) Neural Network

The neural network may include a neuron. The neuron may be an operation unit that uses $x_s$ and an intercept of 1 as an input. An output of the operation unit may be shown as a formula (1-1):

$$h_{W,b}(x) = f(W^T x) = f\left(\sum_{s=1}^{n} W_s x_s + b\right), \tag{1-1}$$

where s=1, 2, . . . , and n, n is a natural number greater than 1, $W_s$ is a weight of $x_s$, and b is a bias of the neuron. f is an activation function of the neuron, used to introduce a non-linear feature into the neural network, to convert an input signal in the neuron into an output signal. The output signal of the activation function may be used as an input of a next convolutional layer, and the activation function may be a sigmoid function. The neural network is a network constituted by connecting a plurality of single neurons together. To be specific, an output of a neuron may be an input to another neuron. An input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood to be a neural network with a plurality of middle layers. The DNN is divided based on locations of different layers, and a neural network in the DNN may be divided into three types: an input layer, a hidden layer, and an output layer. Generally, a first layer is the input layer, a last layer is the output layer, and the middle layer is the hidden layer. Layers are fully connected. To be specific, any neuron in an $i^{th}$ layer is definitely connected to any neuron in an $(i+1)^{th}$ layer.

Although the DNN seems complex, it is not complex in terms of work at each layer. Simply speaking, the DNN is the following linear relationship expression: $\vec{y}=\alpha(w\vec{x}+\vec{b})$, where $\vec{x}$ is an input vector, $\vec{y}$ is an output vector, $\vec{b}$ is an offset vector, w is a weight matrix (also referred to as a coefficient), and $\alpha(\ )$ is an activation function. In each layer, only such a simple operation is performed on the input vector $\vec{x}$ to obtain the output vector $\vec{y}$. Due to a large quantity of DNN layers, quantities of coefficients W and bias vectors $\vec{b}$ are also large. Definitions of these parameters in the DNN are as follows: The coefficient w is used as an example. It is assumed that in a three-layer DNN, a linear coefficient from a fourth neuron at a second layer to a second neuron at a third layer is defined as $W_{24}^3$. The superscript 3 indicates a layer at which the coefficient W is located, and the subscript corresponds to an output third-layer index 2 and an input second-layer index 4.

In conclusion, a coefficient from a $k^{th}$ neuron at an $(L-1)^{th}$ layer to a $j^{th}$ neuron at an $L^{th}$ layer is defined as $W_{jk}^L$.

It should be noted that there is no W parameter at the input layer. In the deep neural network, more middle layers make the network more capable of describing a complex case in the real world. Theoretically, a model with more parameters has higher complexity and a larger "capacity". It indicates that the model can complete a more complex learning task. A process of training the deep neural network is a process of learning a weight matrix, and a final objective of training is to obtain weight matrices (weight matrices formed by vectors W at many layers) of all layers of a trained deep neural network.

(3) Convolutional Neural Network

The convolutional neural network (CNN) is a deep neural network with a convolutional structure. The convolutional neural network includes a feature extractor including a convolution layer and a sub-sampling layer, and the feature extractor may be considered as a filter. The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes, and each feature plane may include some neurons arranged in a rectangular form. Neurons on a same feature plane share a weight, where the shared weight is a convolution kernel. Weight sharing may be understood as that an image information extraction manner is irrelevant to a location. The convolution kernel may be initialized in a form of a random-size matrix. In a process of training the convolutional neural network, the convolution kernel may obtain an appropriate weight through learning. In addition, a direct benefit brought by weight sharing is that connections between layers of the convolutional neural network are reduced and an overfitting risk is lowered.

(4) Recurrent neural network (RNN) is used to process sequence data and is also referred to as cyclic neural network. A conventional neural network model starts from an input layer to a middle layer and then to an output layer, and the layers are fully connected, while nodes in each layer are unconnected. Such a common neural network resolves many problems, but is still incapable of resolving many other problems. For example, if it is expected to predict a next word in a sentence, a preceding word usually needs to be used, because words in a sentence are not independent. A reason why the RNN is referred to as the recurrent neural network is that a current output of a sequence is also related to a previous output of the sequence. A specific representation form is that the network memorizes previous information and applies the previous information to calculation of the current output. To be specific, nodes at the middle layer are connected, and an input of the middle layer not only includes an output of the input layer, but also includes an output of the middle layer at a previous moment. Theoretically, the RNN can process sequence data of any length. Training of the RNN is the same as training of the conventional CNN or DNN.

Why is the recurrent neural network still required when the convolutional neural network is available? A reason is simple. In the convolutional neural network, there is a premise that elements are independent of each other, and input and output are also independent, such as a cat and a dog. However, in the real world, a plurality of elements is interconnected. For example, the stock changes with time. For another example, a person says "I like traveling, and the most favorite place is Yunnan. In the future, when there is a chance, I will go to (_). Herein, people should know that the person will go to "Yunnan". Because people perform inference from the context. However, how do machines do that? Then, the RNN emerges. The RNN is intended to make the machine capable of memorizing like a human. Therefore, an output of the RNN needs to depend on current input information and historical memorized information.

(5) Super-Resolution

Super-resolution (SR) is an image enhancement technology, and refers to restoring high-frequency detail information of a given image or a given group of low-resolution images by learning prior knowledge of the image and image similarity and through multi-frame image information complementation, to generate a higher-resolution target image. In application, the super-resolution may be classified into single image super-resolution and video super-resolution based on a quantity of input images. The super-resolution has important application value in fields such as HDTV, observation devices, satellite images, and medical imaging.

(6) Video Super-Resolution

Video super-resolution (VSR) is an enhancement technology for video processing, and aims to convert a low-resolution video into a high-quality, high-resolution video. The video super-resolution may be classified into multi-frame video super-resolution and cyclic video super-resolution based on a quantity of input frames.

For example, the following uses the convolutional neural network (CNN) as an example.

The CNN is a deep neural network with a convolutional structure. The CNN is a deep learning architecture. The deep learning architecture uses a machine learning algorithm to perform multi-level learning at different abstract levels. As the deep learning architecture, the CNN is a feed-forward artificial neural network. Neurons in the feed-forward artificial neural network make response to an overlapping region in an image typed to the CNN. The convolutional neural network includes a feature extractor including a convolutional layer and a sub-sampling layer. The feature extractor may be considered as a filter. A convolution process may be considered as performing convolution by using a trainable filter and an input image or a convolution feature plane. The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes, and each feature plane may include some neurons arranged in a rectangular form. Neurons on a same feature plane share a weight, where the shared weight is a convolution kernel. Weight sharing may be understood as that an image information extraction manner is irrelevant to a location. A principle implied herein is that statistical information of a part of an image is the same as that of other parts. This means that image information learned in a part can also be used in another part. Therefore, image information obtained through same learning can be used for all locations in the image. At a same convolutional layer, a plurality of convolution kernels may be used to extract different image information. Usually, a larger quantity of convolution kernels indicates richer image information reflected in a convolution operation.

The convolution kernel may be initialized in a form of a random-size matrix. In a process of training the convolutional neural network, the convolution kernel may obtain an appropriate weight through learning. In addition, a direct benefit brought by weight sharing is that connections between layers of the convolutional neural network are reduced and an overfitting risk is lowered.

The convolutional neural network may correct a value of a parameter in an initial super-resolution model in a training process according to an error back propagation (BP) algorithm, so that an error loss of reconstructing the super-resolution model becomes smaller. Specifically, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, such as a weight matrix, of an optimal super-resolution model.

Figure 2:
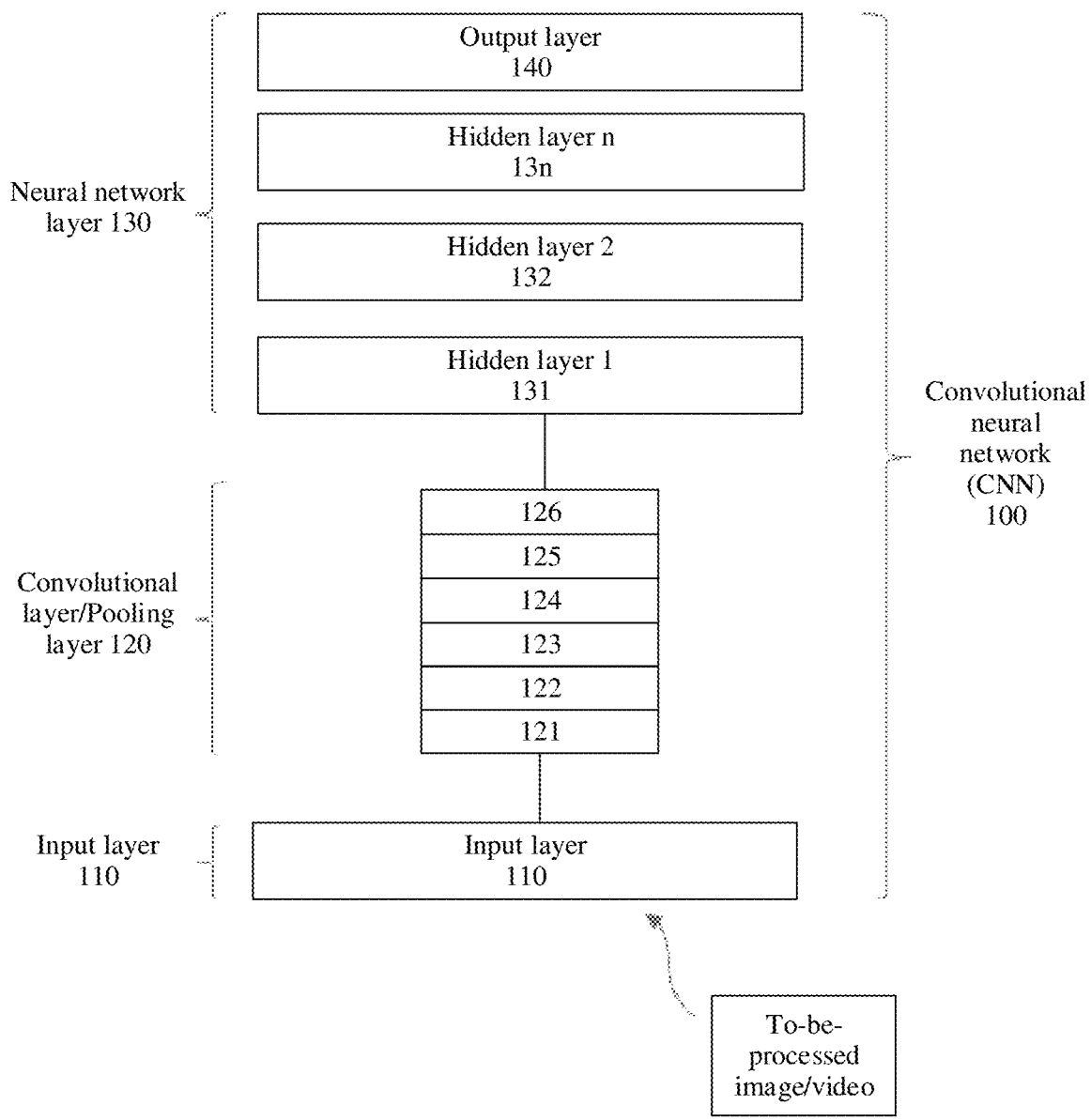
FIG. 2 is a schematic diagram of a structure of a convolutional neural network according to an embodiment of this disclosure.

As shown in FIG. 2, a convolutional neural network (CNN) 100 may include an input layer 110, a convolutional layer/pooling layer 120, and a neural network layer 130. The pooling layer is optional.

As shown in FIG. 2, for example, the convolutional layer/pooling layer 120 may include layers 121 to 126. In an implementation, the layer 121 is a convolutional layer, the layer 122 is a pooling layer, the layer 123 is a convolutional layer, the layer 124 is a pooling layer, the layer 125 is a convolutional layer, and the layer 126 is a pooling layer. In another implementation, the layer 121 and the layer 122 are convolutional layers, the layer 123 is a pooling layer, the layer 124 and the layer 125 are convolutional layers, and the layer 126 is a pooling layer. To be specific, an output of a convolutional layer may be used as an input of a subsequent pooling layer, or may be used as an input of another convolutional layer to continue to perform a convolution operation.

The convolutional layer 121 is used as an example. The convolutional layer 121 may include a plurality of convolution operators. A convolution operator is also referred to as a kernel. In image processing, the convolution operator functions as a filter that extracts specific information from an input image matrix. The convolution operator may be a weight matrix essentially, and the weight matrix is usually predefined. In a process of performing a convolution operation on an image, the weight matrix usually processes pixels at a granularity level of one pixel (or two pixels, depending on a value of a stride) in a horizontal direction on an input image, to extract a specific feature from the image. A size of the weight matrix is related to a size of the image. It should be noted that a depth dimension of the weight matrix is the same as a depth dimension of the input image. In a convolution operation process, the weight matrix extends to an entire depth of the input image. Therefore, a convolution output of a single depth dimension is generated by performing convolution with a single weight matrix. However, in most cases, a plurality of weight matrices of a same dimension rather than the single weight matrix is used. Output of the weight matrices is stacked to form a depth dimension of a convolutional image. Different weight matrices may be used to extract different features from the image. For example, one weight matrix is used to extract edge information of the image, another weight matrix is used to extract a specific color of the image, and still another weight matrix is used to blur unnecessary noise in the image. The plurality of weight matrices has the same dimension, and feature maps extracted from the plurality of weight matrices with the same dimension have a same dimension. Then, the plurality of extracted feature maps with the same dimension is combined to form an output of the convolution operation.

Weight values in the weight matrices need to be obtained through massive training in an actual application. Each weight matrix formed by using the weight values obtained through training may be used to extract information from the input picture, to enable the convolutional neural network 100 to perform correct prediction.

When the convolutional neural network 100 includes a plurality of convolutional layers, a larger quantity of general features is usually extracted at an initial convolutional layer (for example, the convolutional layer 121). The general features may be also referred to as low-level features. As a depth of the convolutional neural network 100 increases, a feature extracted at a more subsequent convolutional layer (for example, the convolutional layer 126) is more complex, for example, a high-level semantic feature. A feature with higher semantics is more applicable to a to-be-resolved problem.

Pooling Layer:

Because a quantity of training parameters usually needs to be reduced, a pooling layer usually needs to be periodically introduced after a convolutional layer. To be specific, for the layers 121 to 126 in the layer 120 the shown in FIG. 2, one convolutional layer may be followed by one pooling layer, or a plurality of convolutional layers may be followed by one or more pooling layers. During picture processing, the pooling layer is only used to reduce a space size of the picture. The pooling layer may include an average pooling operator and/or a maximum pooling operator, to perform sampling on the input picture to obtain a picture with a relatively small size. The average pooling operator may compute a pixel value in the image within a specific range, to generate an average value. The maximum pooling operator may be used to select a pixel with a maximum value in a specific range as a maximum pooling result. In addition, similar to a case in which a size of a weight matrix in the convolutional layer should be related to a size of the image, an operator in the pooling layer should be also related to the size of the image. A size of a processed picture output from the pooling layer may be less than a size of a picture input to the pooling layer. Each pixel in the picture output from the pooling layer represents an average value or a maximum value of a corresponding sub-region of the picture input to the pooling layer.

Neural Network Layer 130:

After processing is performed at the convolutional layer/pooling layer 120, the convolutional neural network 100 still cannot output required output information. As described above, at the convolutional layer/pooling layer 120, only a feature is extracted, and parameters resulting from an input image are reduced. However, to generate final output information (required class information or other related information), the convolutional neural network 100 needs to use the neural network layer 130 to generate an output of one required class or outputs of a group of required classes. Therefore, the neural network layer 130 may include a plurality of hidden layers (131 and 132 to 13$n$ shown in FIG. 2) and an output layer 140. In this disclosure, the convolutional neural network is a serial network obtained by deforming the selected start point network at least once, and then is obtained based on a trained serial network. The convolutional neural network may be used for image recognition, image classification, super-resolution image reconstruction, and the like.

At the neural network layer 130, the plurality of hidden layers are followed by the output layer 140, that is, the last layer of the entire convolutional neural network 100. The output layer 140 has a loss function similar to a categorical cross entropy, and the loss function is specifically configured to calculate a prediction error. Once forward propagation (for example, propagation from 110 to 140 in FIG. 2 is forward propagation) of the entire convolutional neural network 100 is completed, reverse propagation (for example, propagation from 140 to 110 in FIG. 2 is reverse propagation) is started to update a weight value and a deviation of each layer mentioned above, to reduce a loss of the convolutional neural network 100 and an error between a result output by the convolutional neural network 100 by using the output layer and an ideal result.

Figure 3:
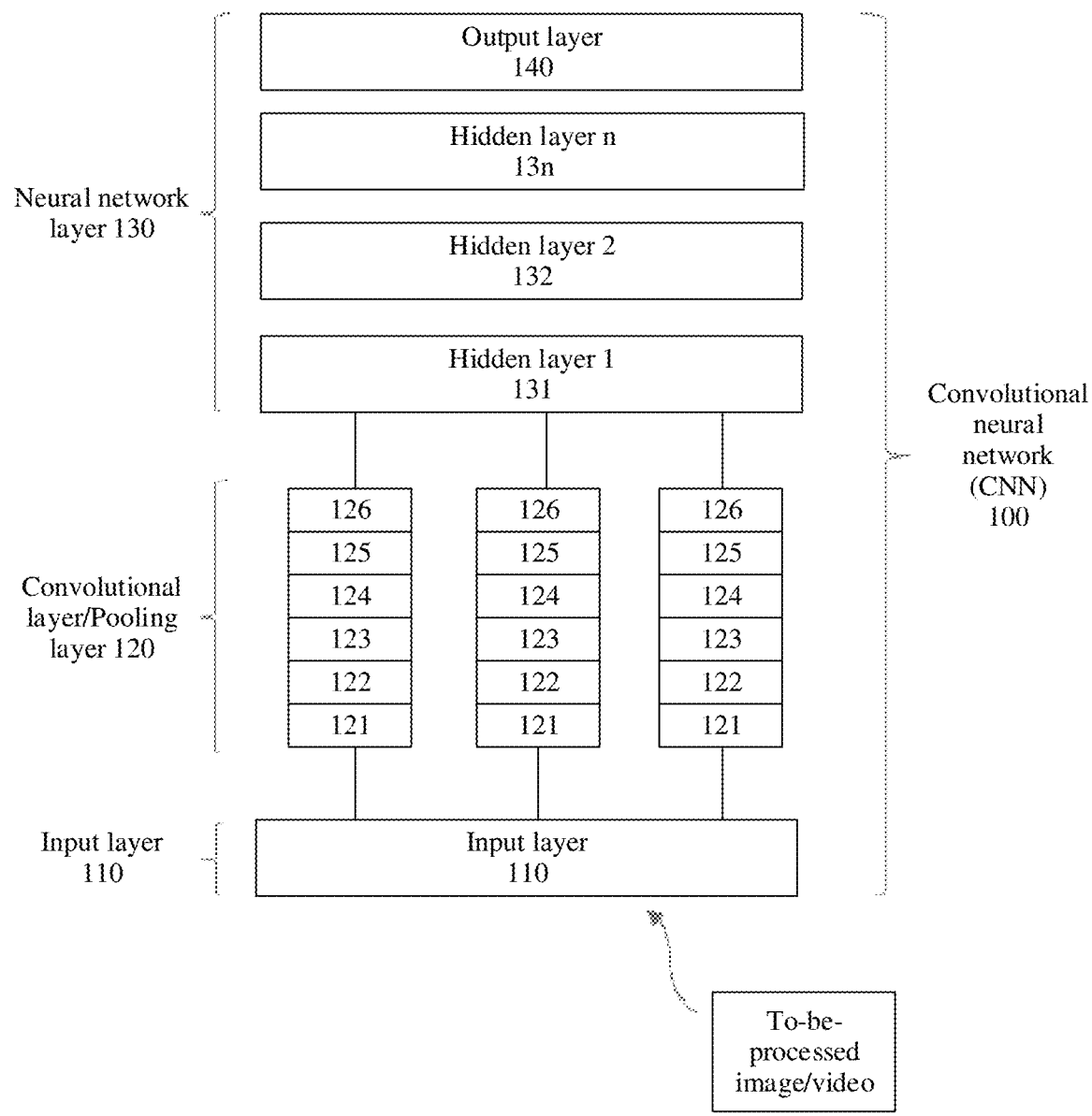
FIG. 3 is a schematic diagram of a structure of another convolutional neural network according to an embodiment of this disclosure.

It should be noted that the convolutional neural network 100 shown in FIG. 2 is merely used as an example of a convolutional neural network. During specific application, the convolutional neural network may alternatively exist in a form of another network model, for example, a plurality of parallel convolutional layers/pooling layers shown in FIG. 3, and extracted features are all input to the entire neural network layer 130 for processing.

The image processing method provided in this disclosure may be applied to a video live broadcast, a video call, album management, a smart city, human-computer interaction, and another scenario that needs to involve video data.

Figure 4A:
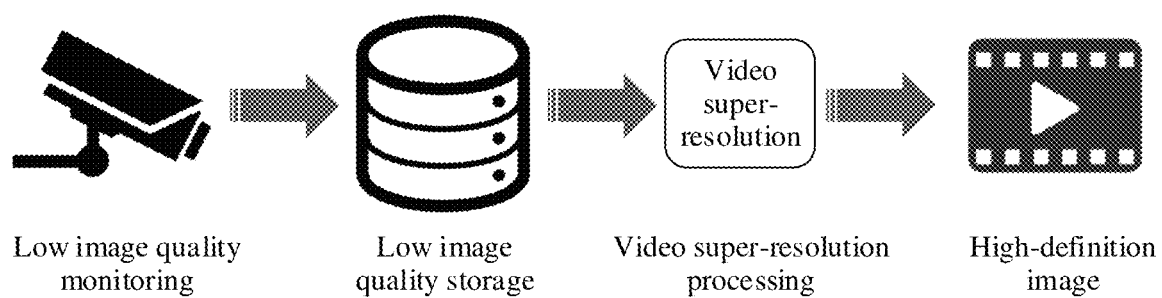
FIG. 4A is a schematic diagram of an application scenario of an image processing method according to an embodiment of this disclosure.

For example, the image processing method provided in this disclosure may be applied to a smart city scenario. As shown in FIG. 4A, low-image-quality video data collected by each observation device, that is, low-resolution video data, may be collected, and the low-image-quality video data is stored in a memory. When the video data is played, super-resolution processing may be performed on the video data by using the image processing method provided in this disclosure, to obtain video data with a higher resolution, thereby improving viewing experience of a user.

For another example, the image processing method provided in this disclosure is further applied to various video shooting scenarios. For example, a user may use a terminal to shoot a video. To reduce a storage amount occupied by the video, compression or downsampling processing may be performed on the video, to obtain video data that occupies a smaller storage amount. When the user plays the video by using the terminal, super-resolution processing may be performed on the stored video data by using the image processing method provided in this disclosure, to obtain video data with a higher resolution, thereby improving viewing experience of the user.

Figure 4B:
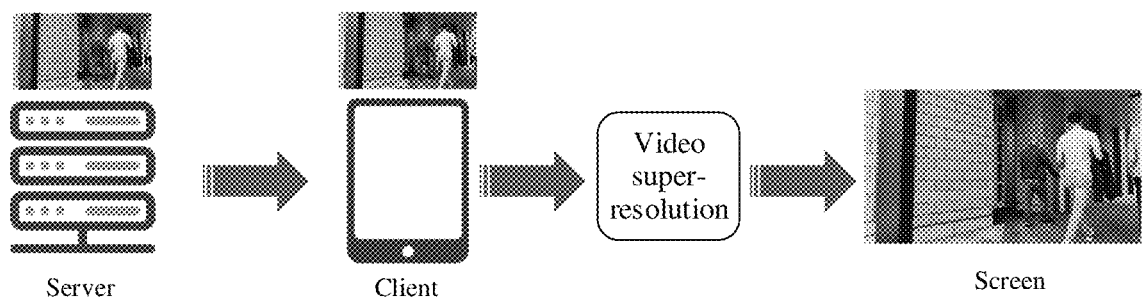
FIG. 4B is a schematic diagram of an application scenario of an image processing method according to an embodiment of this disclosure.

For still another example, the image processing method provided in this disclosure may be applied to a video live broadcast scenario. As shown in FIG. 4B, a server may send a video stream to a client used by a user. To reduce a transmission bandwidth during live broadcast, the transmitted video stream can be compressed. After receiving a data stream sent by the server, the client may perform super-resolution processing on the data stream by using the image processing method provided in this disclosure, to obtain video data with higher resolution, thereby improving viewing experience of the user.

Figure 5A:
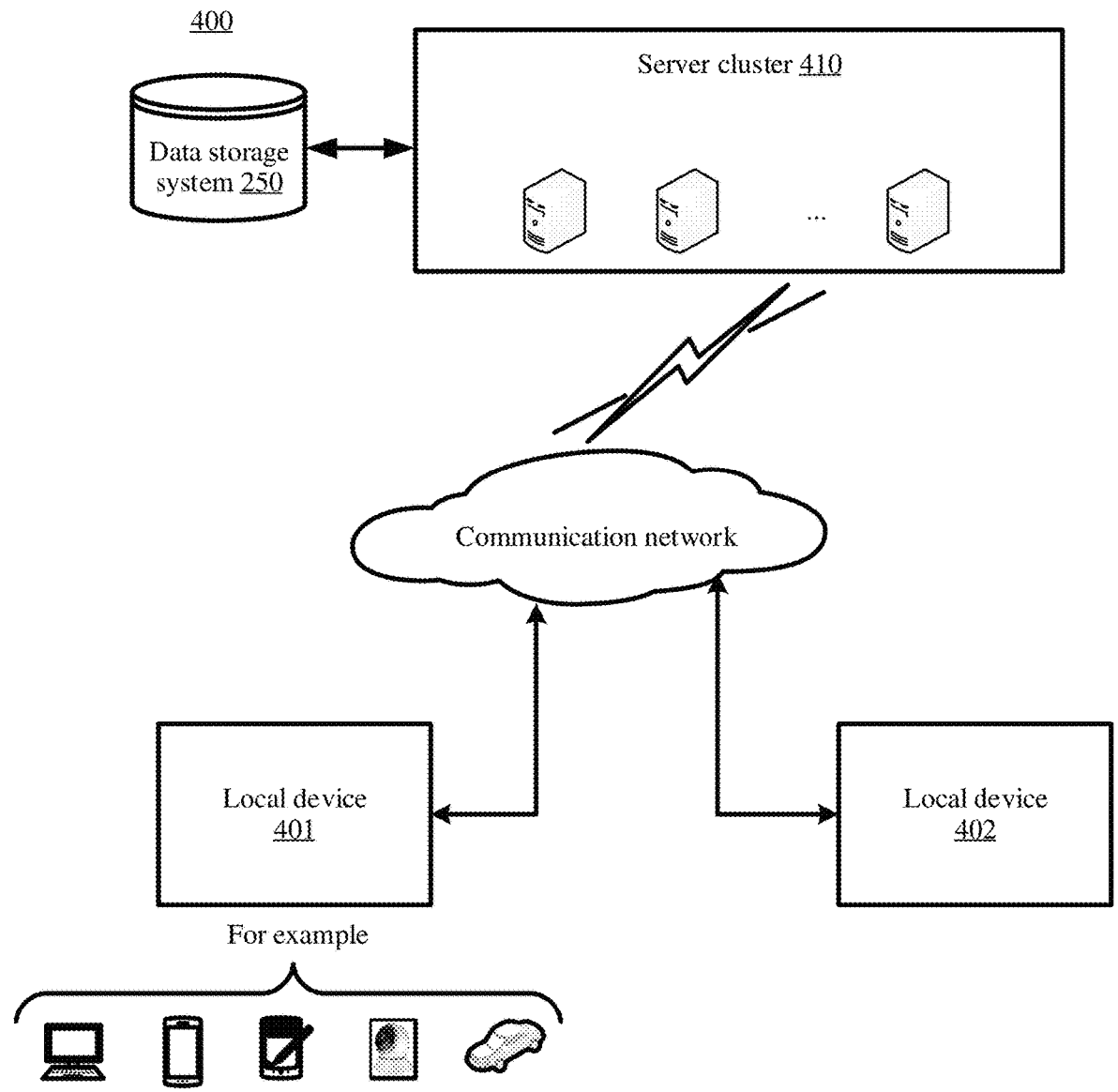
FIG. 5A is a schematic diagram of a system architecture according to this disclosure.

For example, a system architecture to which the image processing method provided in this disclosure is applied may be shown in FIG. 5A. In a system architecture 400, a server cluster 410 is implemented by one or more servers. Optionally, the server cluster 410 cooperates with another computing device, for example, a device such as a data storage, a router, or a load balancer. The server cluster 410 may implement the steps of the image processing method provided in this disclosure by using data in a data storage system 250 or by invoking program code in the data storage system 250.

A user may operate a respective user device (for example, a local device 401 and a local device 402) to interact with the server cluster 410. Each local device may be any computing device, such as a personal computer, a computer workstation, a smartphone, a tablet computer, an intelligent camera, a smart automobile or another type of cellular phone, a media consumption device, a wearable device, a set-top box, or a game console.

A local device of each user may interact with the server cluster 410 through a communication network of any communication mechanism/communication standard. The communication network may be a wide area network, a local area network, a point-to-point connection, or any combination thereof. Specifically, the communication network may include a wireless network, a wired network, a combination of a wireless network and a wired network, or the like. The wireless network includes but is not limited to any one or any combination of a 5th generation (5G) mobile communication technology system, a long term evolution (LTE) system, a global system for mobile communication (GSM), a code division multiple access (CDMA) network, a wideband code division multiple access (WCDMA) network, wireless fidelity (Wi-Fi), Bluetooth, ZigBee, a radio frequency identification (RFID) technology, long range (Lora) wireless communication, and near field communication (NFC). The wired network may include an optical fiber communication network, a network formed by coaxial cables, or the like.

Figure 5B:
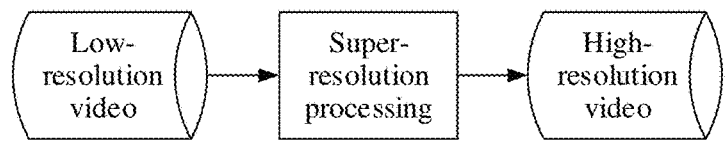
FIG. 5B is a schematic diagram of an application scenario of an image processing method according to an embodiment of this disclosure.

For example, in an application scenario, any server in the server cluster 410 may obtain video data from the data storage system 250 or another device such as a terminal or a PC. If the video data is a low-resolution video, the server may send the low-resolution video to a local device by using a communication network. If the video data is a high-resolution video, to reduce a bandwidth occupied for transmitting the video data, the server may perform downsampling on the video data to obtain a low-resolution video, and send the low-resolution video to a local device by using a communication network. Therefore, after receiving the low-resolution video, as shown in FIG. 5B, the local device may perform super-resolution processing on the low-resolution video to obtain a high-resolution video.

In a super-resolution task, a deep neural network, with a powerful learning capability, has quickly surpassed a conventional manual feature-based method and achieved great success. A super-resolution method based on the deep neural network can generate a clearer high-quality super-resolution image with fewer artifacts, thereby further promoting implementation and application of a super-resolution technology. For example, in a streaming video application, a downsampled video stream with low resolution may be transmitted by using a network, and after receiving the video stream, a client converts the video stream into a high-resolution image by using the super-resolution technology and plays the image, thereby effectively reducing a requirement for a network bandwidth. In video observation, due to a limitation of an installation position and storage of an observation camera, the resolution of an observed image is usually low. The super-resolution technology may be used to convert the video stream into a clearer version, providing more detailed information for subsequent tasks such as target facial recognition and pedestrian re-recognition. The super-resolution technology has also been widely used in high-definition old movies, medical images, and other applications.

By virtue of continuous improvement of computing power of a graphic processing unit (GPU) and rapid development of a deep convolution network, effect of a super-resolution network is greatly improved, which further promotes application of the super-resolution technology. In addition to improvement of the effect, the super-resolution network becomes more complex, and a computation amount increases accordingly. This greatly limits application of the super-resolution technology in some low-computing devices such as a mobile phone, a camera, and a smart home. With a gradual increase of a camera pixel of a mobile device, the computation amount of the super-resolution network increases rapidly with an increase of image resolution.

Therefore, to implement efficient and accurate super-resolution processing, this disclosure provides an image processing method for a video, to implement lightweight calculation based on a recursive network, so that super-resolution processing of a video can run in real time.

The following describes a procedure of the image processing method provided in this disclosure.

Figure 6:
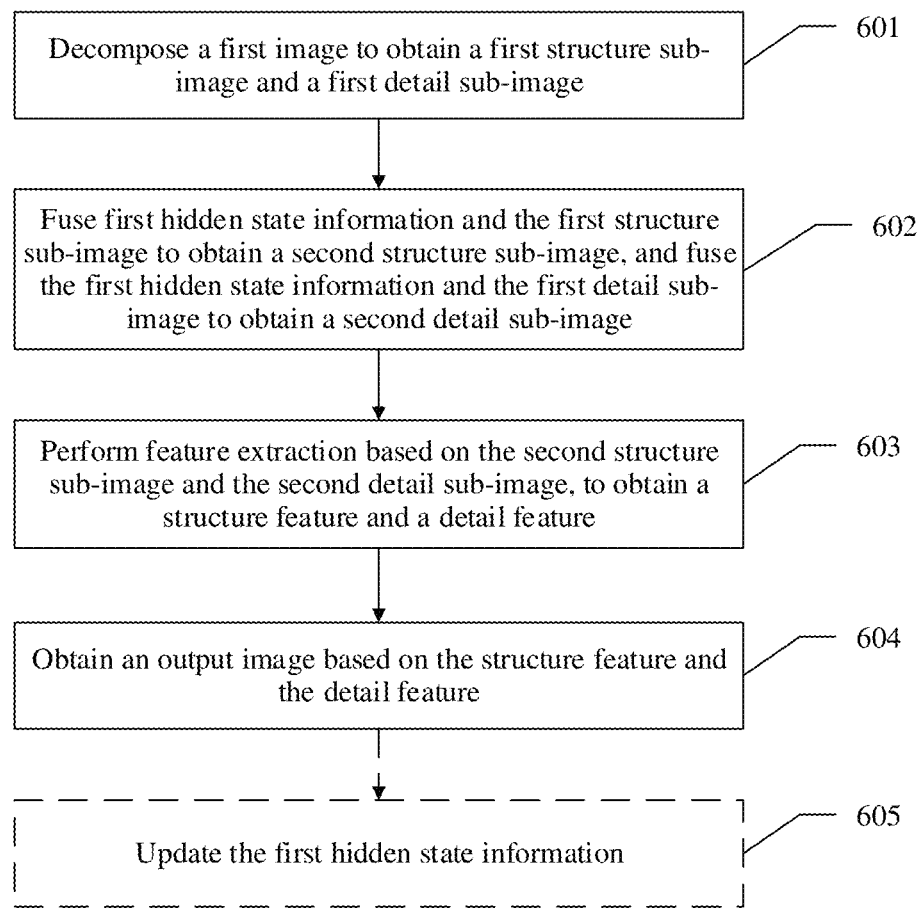
FIG. 6 is a schematic flowchart of an image processing method according to an embodiment of this disclosure.

FIG. 6 is a schematic flowchart of an image processing method according to this disclosure. Details are as follows:

601: Decompose a first image to obtain a first structure sub-image and a first detail sub-image.

Before step 601, video data may be further obtained. The video data may be a video stream, complete video data, or the like. The video data may include a plurality of frames of images, and the first image is any one of the frames of images.

A second image mentioned in the following is one or more frames of images adjacent to the first image, and details are not described in the following. For example, the second image may be one or more frames of images arranged before the first image in a playing time sequence. Alternatively, if a video is processed in a time sequence opposite to a playing time sequence of the video, the second image may be one or more frames of images arranged after the first image.

Generally, structure information is a low-frequency image component, and detail information corresponds to a high-frequency image component. Therefore, in this step, information included in the first image may be classified into high frequency information and low frequency information. The high frequency information forms the first detail sub-image, and the low frequency information forms the first structure sub-image.

Specifically, there may be a plurality of manners of decomposing the first image. For example, the first image may be decomposed in a manner of downsampling and upsampling, or may be decomposed in a manner of low-pass filtering, which may be specifically adjusted based on an actual application scenario. This is not limited herein.

For example, if the first image is decomposed in the manner of downsampling and upsampling, specific steps may include: performing downsampling on the first image to obtain a downsampled image; performing upsampling on the downsampled image to obtain the first structure sub-image; and removing the first structure sub-image from the first image to obtain the first detail sub-image. In this implementation, a feature included in the first image may be obtained by performing downsampling on the first image, and then a dimension of the first structure sub-image is kept consistent with a dimension of the first image by performing upsampling, and the first structure sub-image obtained by performing upsampling is subtracted from the first image, to obtain the first detail sub-image of the first image.

For another example, if the first image is decomposed in the manner of low-pass filtering, specific steps may include: adding a low-pass filter, filtering out a low-frequency part of the first image to obtain the first structure sub-image, and then subtracting the first structure sub-image from the first image to obtain the first detail sub-image. Certainly, a high-frequency part in the first image may alternatively be filtered out in a manner of high-pass filtering to obtain the first detail sub-image, and then the first detail sub-image is removed from the first image to obtain the first structure sub-image.

602: Fuse first hidden state information and the first structure sub-image to obtain a second structure sub-image, and splice the first hidden state information and the first detail sub-image to obtain a second detail sub-image.

The first hidden state information includes a feature extracted from the second image. The first hidden state information may also be understood as an image including a feature of the second structure sub-image, and a dimension of the first hidden state information is the same as that of the first image.

Specifically, the first hidden state information and the first structure sub-image may be fused to obtain the second structure sub-image with reference to a feature of the second image, and the first hidden state information and the first detail sub-image are fused to obtain the second detail sub-image with reference to a feature of the second image.

For ease of understanding, hidden state information may be understood as a feature map generated by a network, including a feature extracted from a past frame, and is stored historical information. In a super-resolution processing process, a hidden state information provides historical information, and performs time-space fusion with a feature of a current input frame, so that more feature expressions can be obtained, thereby improving super-resolution effect of a current input frame. In addition, presence of the hidden state information helps output a more stable result, effectively reduces video jitter, and improves image viewing.

Generally, because the hidden state information stores the historical information, new historical information may be added to the hidden state information after each frame is processed. As a result, a large amount of redundant (for example, outdated or useless) information usually exists in the hidden state information. As a quantity of frames processed recursively increases, the redundant information gradually occupies most content of the hidden state information. Therefore, optionally, to improve effective utilization of the hidden state information, adaptive filtering may be performed on a first hidden state information, to filter out redundant information in the first hidden state information.

A specific filtering process may include: obtaining a similarity matrix between the first hidden state information and the first image, where the similarity matrix includes one or more similarities, the one or more similarities indicate a similarity between an image region included in the first hidden state information and a corresponding image region in the first image, and each image region may include one or more pixels; and then filtering the first hidden state information based on the similarity matrix to obtain second hidden state information, where a similarity between each image region in the second hidden state information and the image region in the first image is higher than a similarity between each image region in the first hidden state information and the image region in the first image. Correspondingly, step 602 may include: splicing the first structure sub-image and the first detail sub-image separately by using the second hidden state information, to obtain the second structure sub-image and the second detail sub-image.

Therefore, in this implementation, information that is not similar to the first image and that is in the first hidden state may be filtered out by using the similarity matrix, to obtain the second hidden state information that is more similar to and has a higher association degree with the first image. In this way, structures and details of the second structure sub-image and the second detail sub-image that are obtained through fusion by using the second hidden state information may be richer, so that a subsequently obtained output image is clearer and has a higher resolution.

603: Perform feature extraction based on the second structure sub-image and the second detail sub-image, to obtain a structure feature and a detail feature.

After the second structure sub-image and the second detail sub-image are obtained, feature extraction is performed based on the second structure sub-image and the second detail sub-image, to obtain the structure feature and the detail feature.

Specifically, features may be separately extracted from the second structure sub-image and the second detail sub-image. For example, a feature is extracted from the second structure sub-image to obtain the structure feature, and a feature is extracted from the second detail sub-image to obtain the detail feature.

Alternatively, feature extraction may be performed with reference to the second structure sub-image and the second detail sub-image, to obtain the structure feature and the detail feature. For example, iterative fusion may be performed on the second structure sub-image and the second detail sub-image for at least one time to obtain an updated second structure sub-image and an updated second detail sub-image. Then, a feature is extracted from the updated second structure sub-image to obtain the structure feature, and a feature is extracted from the updated second detail sub-image to obtain the detail feature. Therefore, in this implementation, a structure sub-image and a detail sub-image may be fused, so that the structure sub-image and the detail sub-image can enrich information respectively included, so that a finally obtained structure feature and a finally obtained detail feature are more accurate.

If iterative fusion may be performed on the second structure sub-image and the second detail sub-image for at least one time to obtain the updated second structure sub-image and the updated second detail sub-image, further, any process of performing fusion on the second structure sub-image and the second detail sub-image may include: performing fusion on a second structure sub-image obtained in a previous iteration and a second detail sub-image obtained in the previous iteration, to obtain a first fused image of a current iteration; performing fusion on the first fused image and the second structure sub-image obtained in the previous iteration, to obtain a second structure sub-image of the current iteration; and performing fusion on the first fused image and the second detail sub-image obtained in the previous iteration, to obtain a second detail sub-image of the current iteration.

It may be understood that, before the structure feature and the detail feature are extracted, the second structure sub-image and the second detail sub-image interact for at least one time, to exchange information respectively included, so that the finally obtained updated second structure sub-image and the finally obtained second detail sub-image include more information. Further, the finally obtained output image includes more information.

604: Obtain an output image based on the structure feature and the detail feature.

After the structure feature and the detail feature are obtained, the structure feature and the detail feature may be fused to obtain an output image with rich structures and details.

Specifically, after the structure feature and the detail feature are fused to obtain the second fused image, amplification processing may be performed on the second fused image, to obtain an output image with higher resolution.

Therefore, in this implementation, in a process of super-resolution processing of the video data, a structure branch and a detail branch are decomposed for processing, and a structure and a detail are further enriched by using hidden state information, so that a structure and a detail of a finally obtained output image are more enriched. A high-resolution image of a current frame can be efficiently obtained without buffering a plurality of frames to process an intermediate frame.

605: Update the first hidden state information.

Step 605 is an optional step.

After the structure feature and the detail feature are obtained, the first hidden state information may be updated based on the structure feature and the detail feature. In this way, when super-resolution processing is performed on a next frame, a structure and a detail of the next frame image may be enriched based on the updated hidden state information, to obtain a clear high-resolution image.

Specifically, the first hidden state information may be replaced with information obtained after the structure feature and the detail feature are fused. Alternatively, information obtained after the structure feature and the detail feature are fused may be fused with the original first hidden state information, to obtain updated first hidden state information.

Therefore, in this implementation, after a high-resolution image of each frame of input image is obtained, the first hidden state information may be updated. In this way, when super-resolution processing is performed on the next frame, updated and higher-association-degree hidden state information may be used to enrich a structure and a detail of the image, to obtain a clearer finally obtained image.

The foregoing describes the procedure of the image processing method provided in this disclosure. The following further describes, based on the foregoing procedure, the image processing method provided in this disclosure in more detail.

Figure 7:
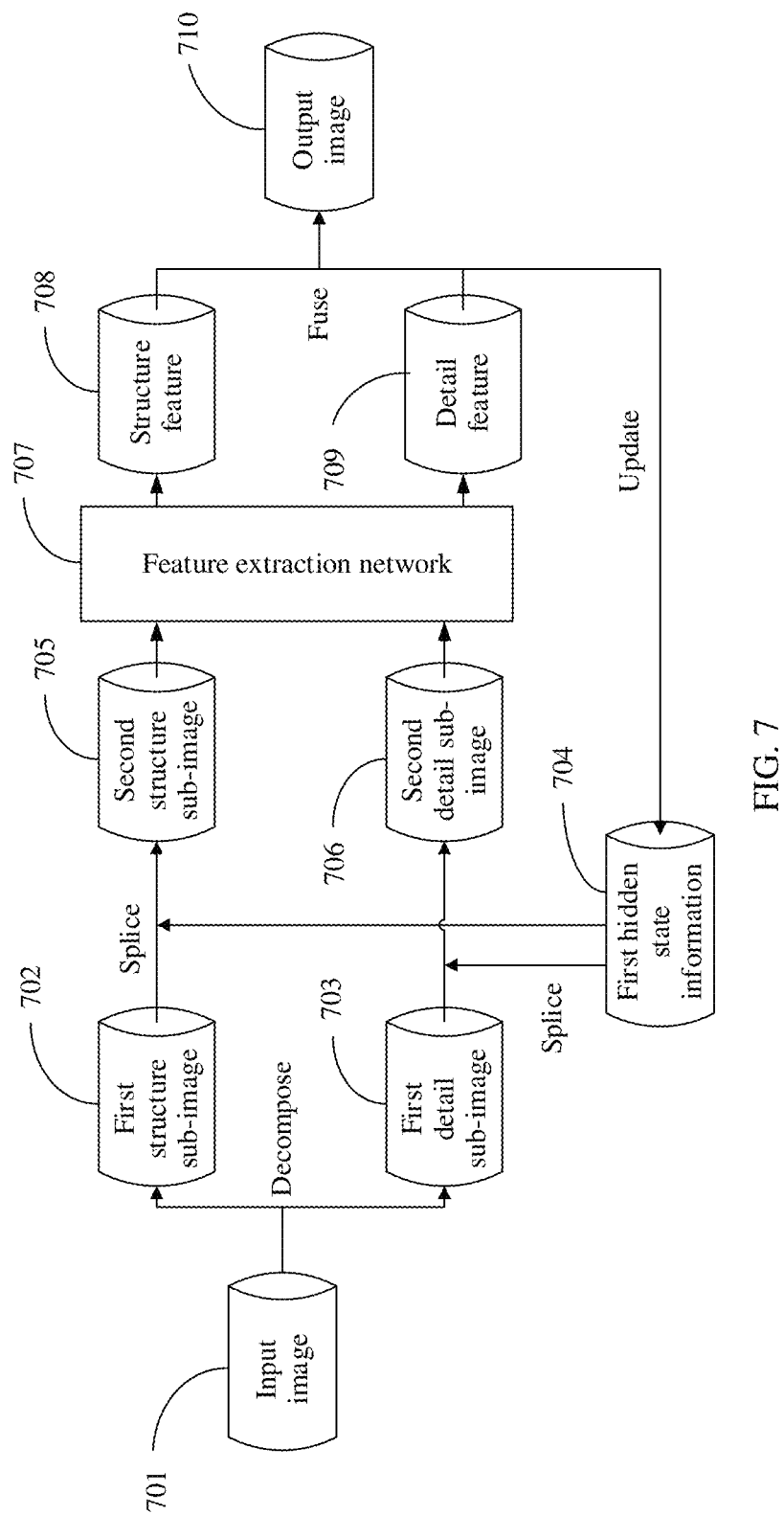
FIG. 7 is a schematic diagram of an image processing architecture according to an embodiment of this disclosure.

For example, FIG. 7 is a schematic flowchart of another image processing method according to this disclosure.

First, a frame is selected from a video as an input image 701, namely, the foregoing first image. The input image 701 is decomposed to obtain a first structure sub-image 702 and a first detail sub-image 703.

In a decomposition manner, for example, downsampling is performed on the input image 701, to obtain a downsampled image. Then, upsampling is performed on the downsampled image to obtain the first structure sub-image 702. The first detail sub-image 703 may be obtained by removing the first structure sub-image from the input image 701. Specifically, for example, an average value or a median of every four pixels in the input image may be obtained, and the four pixels may be combined into one pixel, to obtain a downsampled image. Then, interpolation processing is performed on the downsampled image, to obtain an upsampled image. The upsampled image is the first structure sub-image, and a dimension of the upsampled image is the same as that of the input image. Then, a value of each pixel in the first structure sub-image is subtracted from a value of each pixel in the input image, to obtain the first detail sub-image. A pixel value herein may include a grayscale value, a luminance value, a value of each RGB channel, and the like, which may be specifically adjusted based on an actual application scenario.

Then, the first structure sub-image 702 and the first detail sub-image 703 are separately spliced by using first hidden state information 704, to obtain a second structure sub-image 705 and a second detail sub-image 706.

For example, if the first structure sub-image 702 includes three channels, and the first hidden state information includes three channels, the second structure sub-image including six channels may be obtained by splicing the first structure sub-image and the first hidden state information. Alternatively, for another example, if the first structure sub-image 702 includes three channels, and the first hidden state information includes three channels, values of the three channels included in the first hidden state information may be added to each channel in the first structure sub-image 702, and the finally obtained second structure sub-image includes three channels, but a value of each channel increases. A manner of obtaining the second detail sub-image is similar to a manner of obtaining the first detail sub-image.

Subsequently, a feature extraction network 707 may be used to extract a feature from the second structure sub-image 705 to obtain a structural feature 708, and extract a feature from the second detail sub-image 706 to obtain a detail feature 709. The feature extraction network may include one or more convolution kernels. For example, for the feature extraction network, refer to the foregoing convolutional neural network. This is not limited in this disclosure. Generally, to implement a lightweight super-resolution processing network, a feature extraction network including fewer convolution kernels may be used to extract features. Certainly, to make a final output network clearer, a feature extraction network including more convolution kernels may alternatively be used to extract features.

After the structure feature 708 and the detail feature 709 are obtained, the structure feature 708 and the detail feature 709 may be fused, and amplified to obtain a final output image 710.

In addition, after the structure feature 708 and the detail feature 709 are obtained, the first hidden state information may further be updated by using the structure feature 708 and the detail feature 709. In this way, when super-resolution processing is performed on a next frame, updated first hidden state information may be used for processing, thereby enriching a structure and a detail of a finally obtained output image, and improving user experience.

Figure 8:
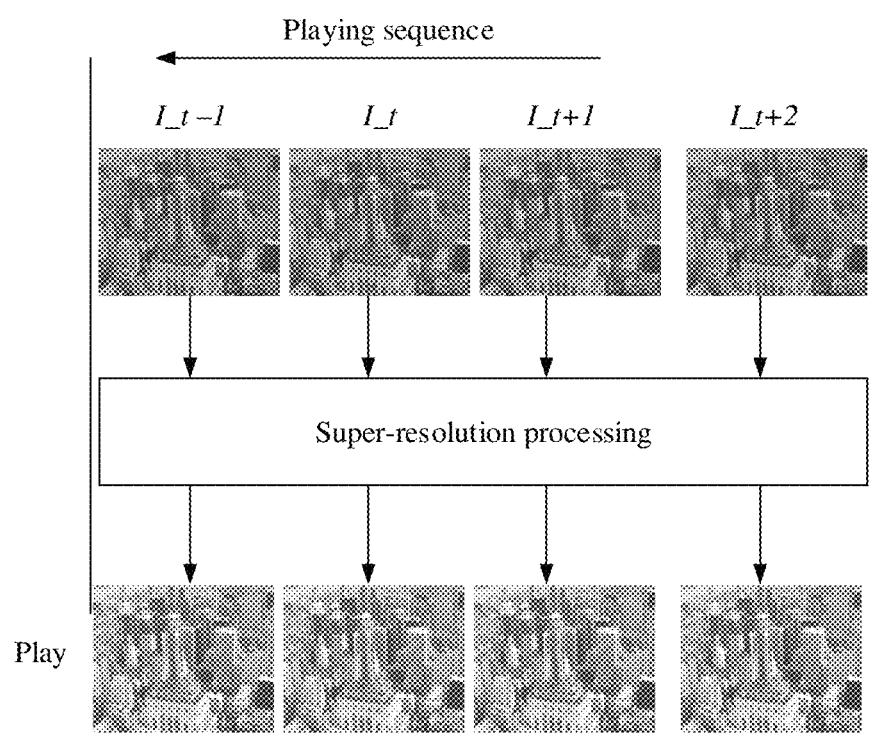
FIG. 8 is a schematic diagram of an application scenario of an image processing method according to an embodiment of this disclosure.

For example, an architecture provided in FIG. 7 may be applied to a scenario shown in FIG. 8. A user may play, by using a mobile phone, a television, a PC, or the like, an image sent by a server. According to a playing sequence, frames of images include: I_t−1, I_t, I_t+1, I_t+2, . . . Super-resolution processing may be performed on each frame of image, to obtain a high-resolution image, thereby improving viewing experience of the user.

Figure 9:
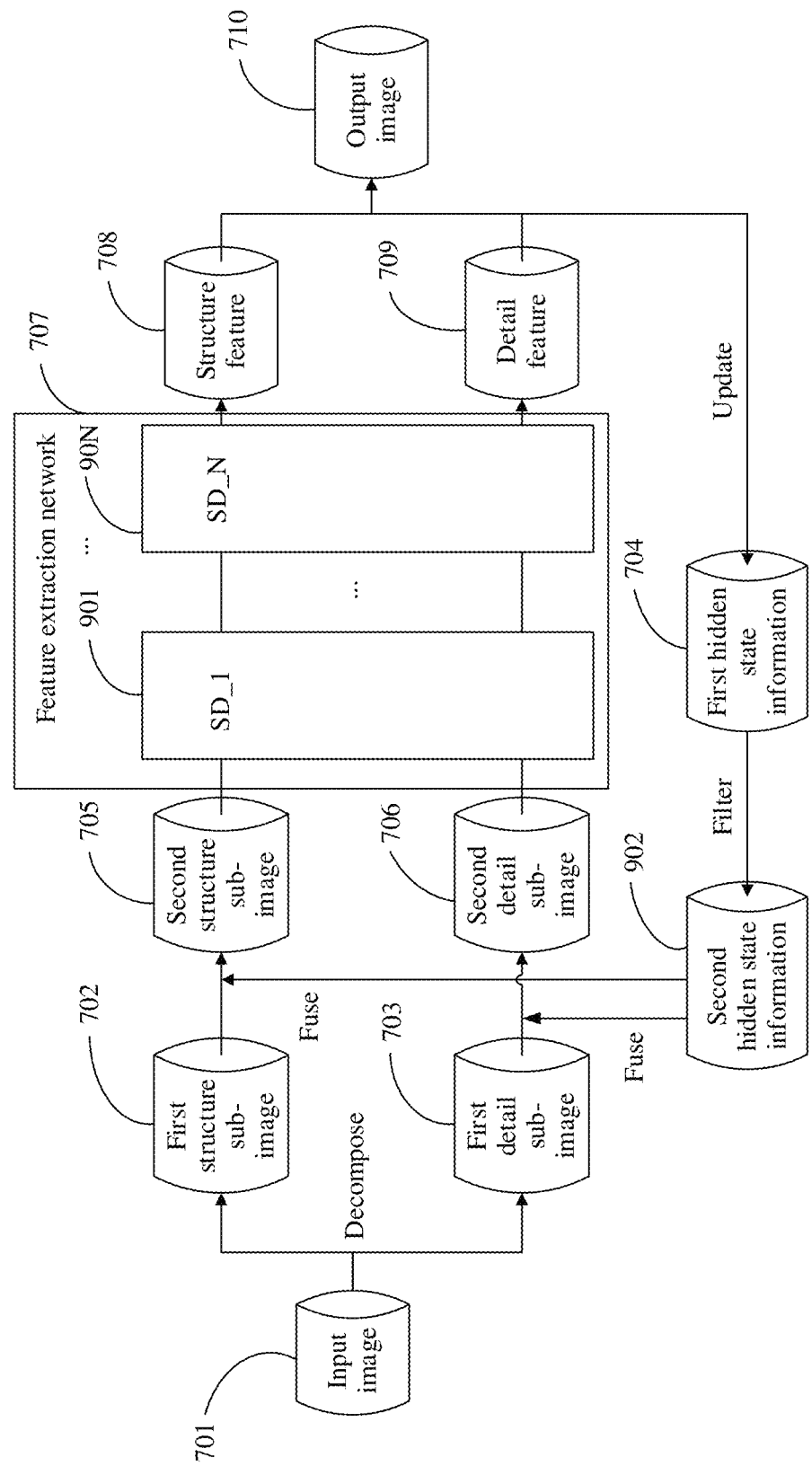
FIG. 9 is a schematic diagram of another image processing architecture according to an embodiment of this disclosure.

The following further describes the architecture shown in FIG. 7. Refer to FIGS. 9. 701 to 706 and 708 to 710 are similar to those shown in FIG. 7. The following describes differences.

The differences between FIG. 9 and FIG. 7 may be as follows: The first hidden state information is filtered, and the second hidden state information obtained through filtering has a higher association degree with the input image 701. Subsequently, the second hidden state information may be used to separately splice the first structure sub-image 702 and the first detail sub-image 703, so that the second structure sub-image 705 and the second detail sub-image 706 that are obtained through splicing include more information, and the finally obtained output image is clearer.

Figure 10:
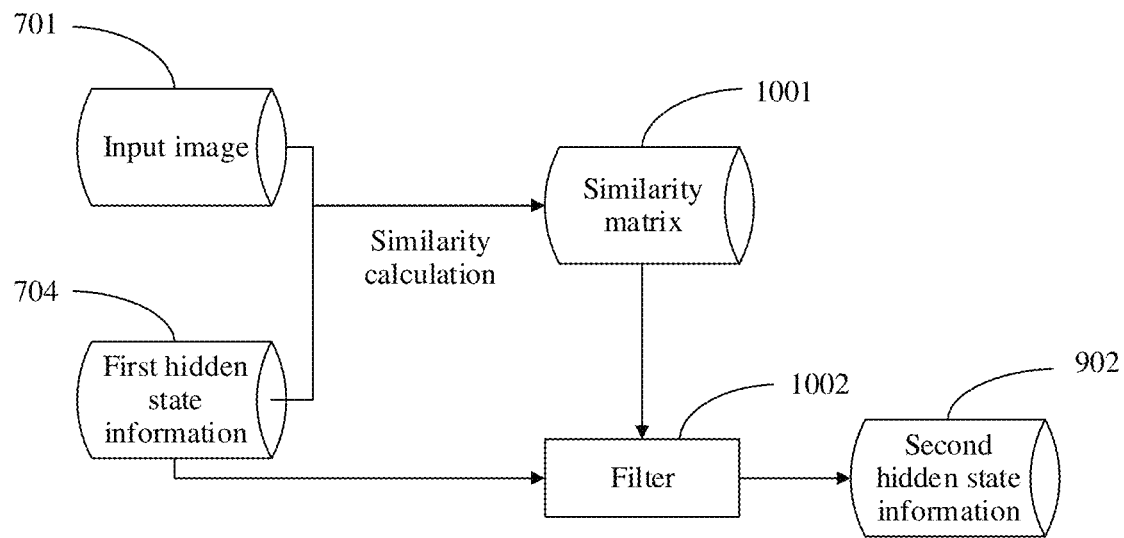
FIG. 10 is a schematic diagram of a hidden state filtering manner according to an embodiment of this disclosure.

For example, for a specific process of filtering the first hidden state information, refer to FIG. 10.

A similarity between the input image 701 and the first hidden state information 704 may be calculated based on a feature of the input image 701, to generate a similarity matrix 1001. For example, the input image may be divided into a plurality of image regions, and each image region includes one or more pixels. Correspondingly, the first hidden state information is divided into a plurality of image regions in a same division manner, and each image region includes one or more pixels. For example, a distribution rule of pixels in each image region in the input image may be matched with a distribution rule of pixels in each image region in the first hidden state, to calculate a similarity between each image region in the input image and a corresponding image region in the first hidden state information, so as to obtain the similarity matrix.

After the similarity matrix 1001 is obtained, the first hidden state information is filtered out based on the similarity matrix 1001, and an image region that is in the first hidden state information and that has a low similarity (for example, lower than a preset similarity) with the input image is filtered out, to obtain second hidden state information 902. The second hidden state information includes an image region that has a high similarity (for example, not lower than the preset similarity) with the input image.

Figure 11:
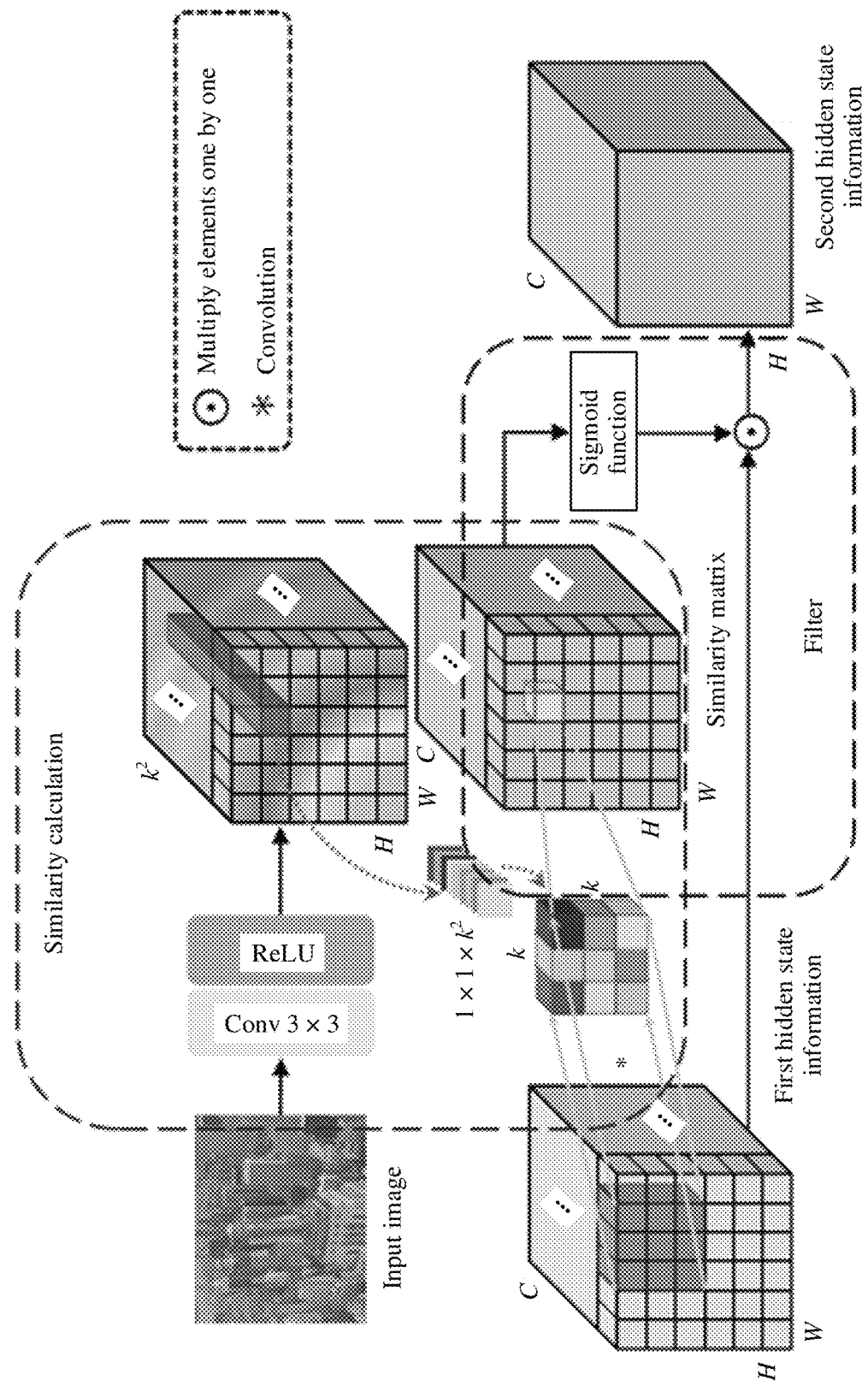
FIG. 11 is a schematic diagram of another hidden state filtering manner according to an embodiment of this disclosure.

For example, as shown in FIG. 11, an application scenario is used as an example to describe a process of filtering hidden state information. In a similarity calculation part, preliminary feature extraction is first performed on an input image based on one convolution layer, to generate a H×W× $k^2$ feature map. For each location (x, y) of the feature map, a 1×1×$k^2$ feature is extracted, and a k×k feature map is obtained through expansion. Based on the k× k feature map, a convolution kernel is constructed, and a 1× 1×C feature corresponding to a (x,y) location in a hidden state (that is, H×W×C) matrix (that is, the first hidden state information) is convolved, and a generated 1× 1× C similarity result is input to a (x,y) location corresponding to the similarity matrix. After such a convolution operation is performed on all (x,y) locations, a similarity matrix of dimensions consistent with the hidden state H×W×C matrix is obtained. A filter part first uses a sigmoid function to normalize the similarity matrix to [0,1], and then performs one-to-one multiplication on the similarity matrix and a hidden state to obtain a hidden state that is finally filtered, that is, the second hidden state information.

In addition, the difference between FIG. 9 and FIG. 7 may further include: The feature extraction network may include N structure detail (SD) modules, where N is a positive integer, such as 901 to 90N shown in FIG. 9. Each SD module is configured to fuse a structure sub-image and a detail sub-image, to enrich information included in the structure sub-image and the detail sub-image.

Figure 12:
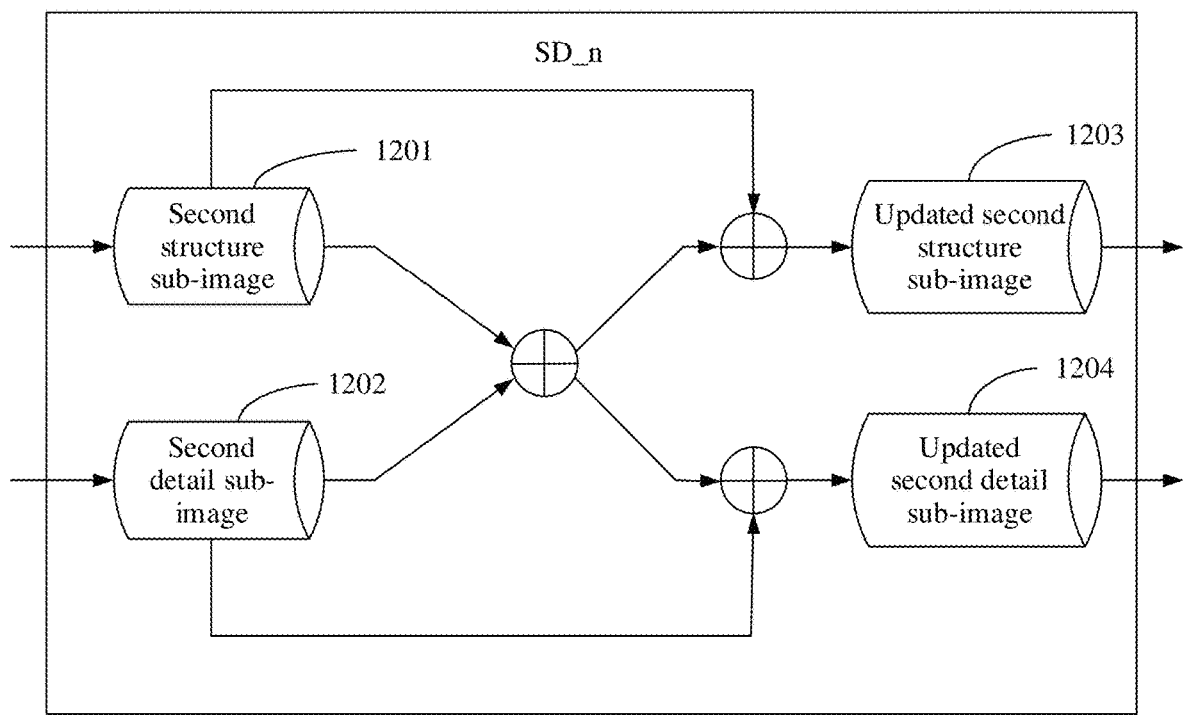
FIG. 12 is a schematic flowchart of image fusion according to an embodiment of this disclosure.

For example, as shown in FIG. 12, one SD_n is used as an example, and the SD_n may be any one of the N SD modules. An input of the SD_n module is a second structure sub-image 1201 and a second detail sub-image 1202 that are output by an SD_n−1 module, and the second structure sub-image 1201 and the second detail sub-image 1202 may be fused to obtain the second fused image.

Then, the second fused image and the second structure sub-image 1201 are fused, so that an updated second structure sub-image 1203 may retain information included in the second structure sub-image before the update. On this basis, information included in the second detail sub-image is further fused. The second fused image and the second detail sub-image 1202 are fused, so that an updated second detail sub-image 1204 may retain the information included in the second detail sub-image before the update. On this basis, the information included in the second structure sub-image is further fused.

Then, the updated second structure sub-image and the updated second detail sub-image that are output by the SD_n are input to a next SD module, that is, an SD_n+1 module.

Figure 13:
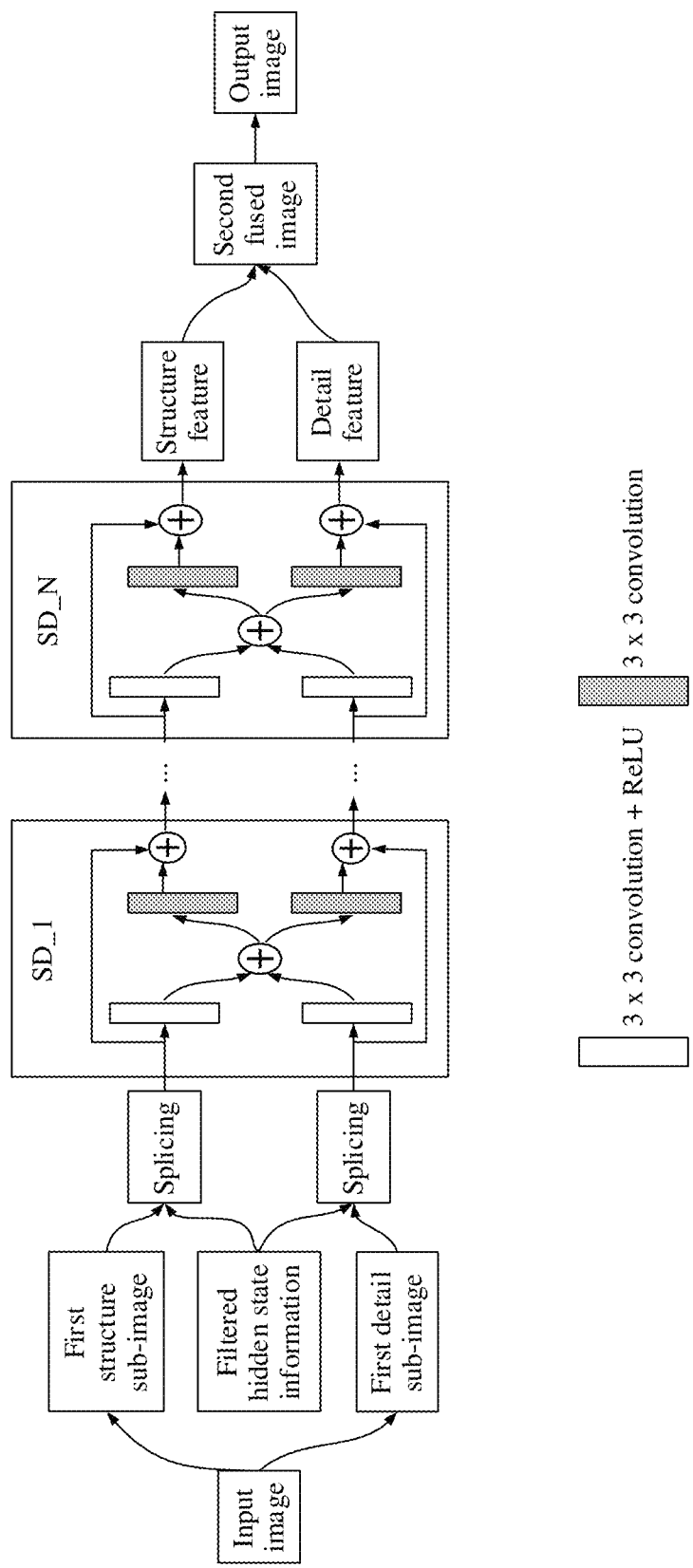
FIG. 13 is a schematic diagram of another image processing architecture according to an embodiment of this disclosure.

In addition, for a procedure of fusing the structure feature, refer to FIG. 13. After the structure feature and the detail feature are obtained, the structure feature and the detail feature are separately processed through 3×3 convolution, to obtain a more stable structure feature and detail feature. Then, the structure feature and the detail feature that are obtained through convolution processing are spliced, and 3×3 convolution processing is performed on a spliced image, to obtain the second fused image. Then pixel shuffle processing is performed on the second fused image to obtain an amplified output image. For example, the resolution of the input image may be 4×4×3, and the resolution of the second fused image obtained through splicing is 4×4×12. Pixel shuffle processing is performed on the second fused image, to obtain an 8×8×3 output image. It can be learned that the resolution of the output image is higher than that of the input image, and a high-resolution image is obtained.

Figure 14:
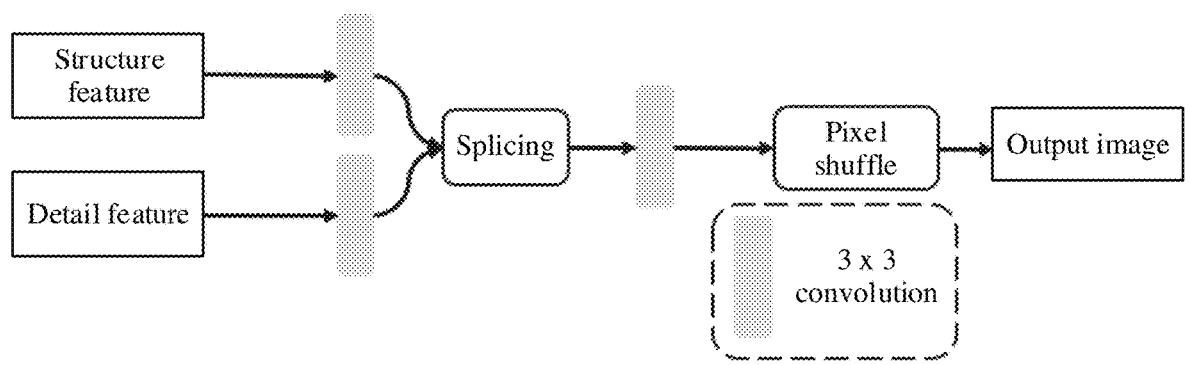
FIG. 14 is a schematic flowchart of an image processing method according to an embodiment of this disclosure.

In addition, for example, for a step of updating the first hidden state information, refer to FIG. 14. After the structure feature and the detail feature are obtained, the structure feature and the detail feature are fused, and 3×3 convolution and ReLU processing are performed on a fused image, to obtain the updated first hidden state information.

Figure 15:
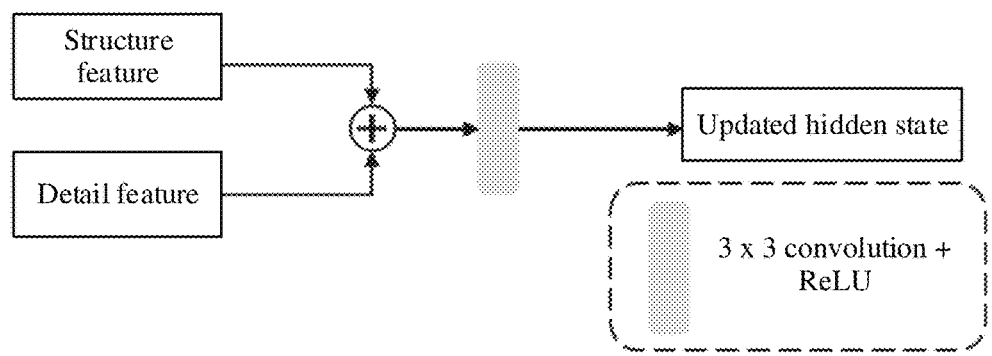
FIG. 15 is a schematic flowchart of a hidden state update according to an embodiment of this disclosure.

For ease of understanding, the super-resolution processing procedure in FIG. 9 may be represented as a super-resolution processing procedure shown in FIG. 15.

Each time after splicing or fusion is completed, 3×3 convolution or 3×3 convolution and a rectified linear unit (ReLU) processing may be added, so that features included in a fused or spliced image are more effective.

Figure 16:
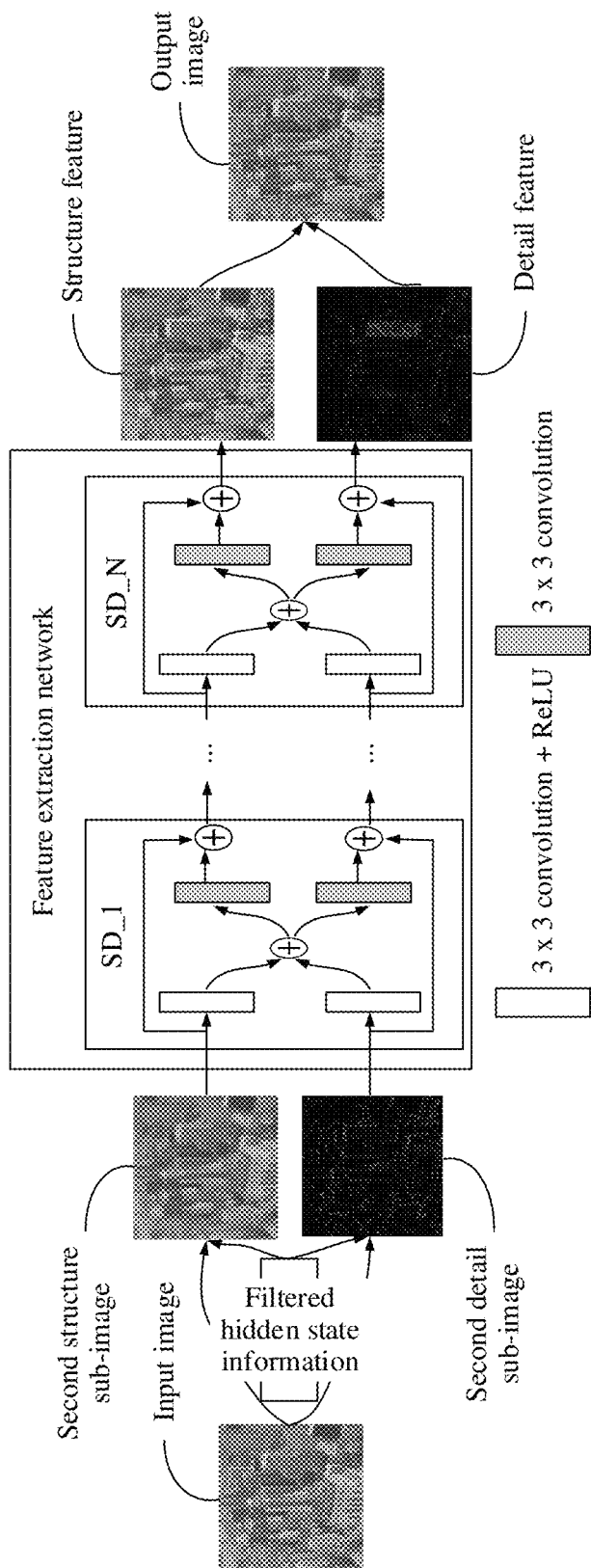
FIG. 16 is a schematic diagram of another image processing architecture according to an embodiment of this disclosure.

Further, for ease of understanding, refer to FIG. 16. One frame of image is used as an example to describe an image processing procedure provided in this disclosure.

First, after one frame of image in video data is collected as an input image, the input image is decomposed, and filtered hidden state information is fused to obtain a first structure sub-image and a first detail sub-image. Then, a second structure sub-image and a second detail sub-image are input into a feature extraction network, and one or more SD modules interact with a structure sub-image and a detail sub-image, to extract a structure feature and a detail feature, and fuse the structure feature and the detail feature to obtain an output image.

Therefore, according to the image processing method provided in this disclosure, a video super-resolution processing method based on a structure-detail dual-branch recursive neural network is provided, and structure (low frequency) information and detail (high frequency) information are explicitly separated in a network and processed by using two branches. This explicit dual-branch structure can effectively enrich information included in the output image, and improve video super-resolution effect. In addition, a step of performing adaptive filtering on a hidden state information in the recursive neural network is proposed. A similarity between a current input and the hidden state is calculated, and the hidden state is filtered based on the similarity, so that outdated information is removed, error accumulation is reduced, and utilization efficiency of the hidden state information is improved.

The following describes, by using an example, effect implemented by the image processing method provided in this disclosure.

For example, a video super-resolution model is trained on a Vimeo-90K dataset, that is, a network that performs the methods in FIG. 6 to FIG. 16 in this disclosure, and a test is performed on a common video super-resolution dataset such as VID4, Vimeo-90K-T, SPMCS, and UDM10, to show effect of processing a low-definition video by using the image processing method provided in this disclosure. To further verify effectiveness of the method provided in this disclosure, a result of a video super-resolution method that provides best performance in both the industry and the academic field in a same scenario is used as horizontal comparison.

The Vimeo-90K dataset is one of common datasets in video super-resolution tasks and contains about 90k video clips. The dataset is collected from a social networking site, and covers various scenarios of daily life and a large quantity of movie clips. Due to a large sample size, various scenarios, and large motion, the Vimeo-90K dataset is a challenging video dataset, and is widely used in video processing tasks. The Vimeo-90K dataset may be divided into a training set and a test set. This disclosure uses Vimeo-90K-T to represent the test set of the Vimeo-90K dataset.

Based on the method provided in this disclosure, a network model is constructed on a PyTorch platform. To evaluate quality of an output result, a peak signal-to-noise ratio (PSNR) and structural similarity index measurement (SSIM) of each frame are separately calculated based on an original high resolution ground truth (GT). Finally, an average PSNR and average SSIM of the entire test set are calculated.

Table 1 shows test results of different methods on a Vid4 test set. The Vid4 test set includes videos with a large quantity of high-frequency details, such as calendar, city, foliage, and walk. The Vid4 test set is one of test sets commonly used in the video processing field to test a high-frequency detail processing capability.

For example, several commonly used image processing methods, such as Bicubic, SPMC (subpixel motion compensation), Liu (Robust Video Super-resolution With Learned Temporal Dynamics), TOFlow (task-oriented flow), DUF (Dynamic Up sampling Filters)-52L, RBPN (recurrent back-projection network), EDVR (Video Restoration with enhanced deformable convolutional networks)-L, PFNL (Progressive fusion video super resolution network via exploiting non-local spatio-temporal correlations), FRVSR (frame recurrent video super resolution) and RLSP (efficient video super resolution through recurrent latent space propagation), are selected to compare output results of the image processing method provided in this disclosure. It can be learned from Table 1 that the method (represented as RSDN) provided in this disclosure implements highest PSNR and SSIM indicators by using a calculation amount (~0.13T Flops) that is far less than that of another method. A calculation amount (measured by Flops) (0.93T) of EDVR-L is more than seven times that of the present invention (0.13T). These results reflect that the present invention can use spatial-temporal information of a video more efficiently, and achieve better video super-resolution effect with a smaller calculation amount.

TABLE 1

| Vid4 | Quantity of input frames | Flops | Quantity of parameters | Calendar (Y) | City (Y) | Foliage (Y) | Walk (Y) | Average PSNR/Average SSIM (Y) | Average PSNR/Average SSIM (RGB channel) |
|---|---|---|---|---|---|---|---|---|---|
| Bicubic | 1 | N/A | N/A | 18.83/ 0.4936 | 23.84/ 0.5234 | 21.52/ 0.4438 | 23.01/ 0.7096 | 21.80/0.5426 | 23.84/0.5234 |
| SPMC | 3 | — | — | —/— | —/— | —/— | —/— | 25.52/0.76 | —/— |
| Liu | 5 | — | — | 21.61/— | 26.29/— | 24.99/— | 28.06/— | 25.23/— | 26.29/— |
| TOFlow | 7 | 0.81T | 1.41M | 22.29/ 0.7273 | 26.79/ 0.7446 | 25.31/ 0.7118 | 29.02/ 0.8799 | 25.84/0.7659 | 26.79/0.7446 |
| DUF-52L | 7 | 0.62T | 5.82M | 24.17/ 0.8161 | 28.05/ 0.8235 | 26.42/ 07758 | 30.91/ 0.9165 | 27.38/0.8329 | 28.05/0.8235 |
| RBPN | 7 | 9.30T | 12.2M | 24.02/ 0.8088 | 27.83/ 0.8045 | 26.21/ 07579 | 30.62/ 0.9111 | 27.17/0.8205 | 27.83/0.8045 |
| EDVR-L | 7 | 0.93T | 20.6M | 24.05/ 0.8147 | 28.27/ 0.8122 | 26.34/ 0.7635 | 31.02/ 0.9152 | 27.35/0.8264 | 28.27/0.8122 |
| PFNL | 7 | 0.70T | 3.00M | 24.37/ 0.8246 | 28.09/ 0.8385 | 26.51/ 0.7768 | 30.65/ 0.9135 | 27.40/0.8384 | 28.09/0.8385 |
| FRVSR 10-128 | Recursion (2) | 0.13T | 5.05M | 23.50/ 0.7932 | 27.82/ 0.8148 | 26.03/ 0.7621 | 29.79/ 0.9059 | 26.78/0.8190 | 27.82/0.8148 |
| RLSP 7-256 | Recursion (3) | 0.09T | 4.21M | 24.35/ 0.8265 | 28.44/ 0.8378 | 26.76/ 0.7897 | 30.62/ 0.9140 | 27.54/0.8422 | 28.44/0.8378 |
| RSDN 5-128 (this disclosure) | Recursion (2) | 0.08T | 3.83M | 24.45/ 0.8289 | 29.29/ 0.8532 | 26.83/ 0.7935 | 30.75/ 0.9162 | 27.83/0.8479 | 29.29/0.8532 |
| RSDN 7-128 (this disclosure) | Recursion (2) | 0.10T | 5.01M | 24.57/ 0.8305 | 29.50/ 0.8572 | 26.95/ 0.7961 | 30.89/ 0.9173 | 27.97/0.8502 | 29.50/0.8572 |
| RSDN 9-128 (this disclosure) | Recursion (2) | 0.13T | 6.19M | 24.66/ 0.8345 | 29.77/ 0.8611 | 27.04/ 0.7988 | 31.09/ 0.9194 | 28.14/0.8534 | 29.77/0.8611 |

To further verify an advantage of the image processing method provided in this disclosure in restoring high-frequency details, horizontal comparison is performed between the image processing method provided in this disclosure and a current mainstream method on a plurality of test sets, including datasets such as SPMCS, UDM10, and Vimeo-90K-T. Results of the horizontal comparison are shown in Table 2. The results show that the method provided in this disclosure significantly surpasses the existing methods on the plurality of test sets and achieves the best results. This indicates the advantage of the method provided in this disclosure in restoring the high-frequency details.

TABLE 2

| SPMCS | Bicubic | TOFlow | DUF-52L | RBPN | SPMC | FRVSR 10-128 | RLSP 7-256 | RSDN 9-128 (this disclosure) |
|---|---|---|---|---|---|---|---|---|
| Flops | N/A | 1.23 | 0.93 | 14.06 | — | 0.204 | 0.140 | 0.202 |
| Running time [ms] | N/A | 932 | 663 | 843 | — | 42 | 11 | 18 |
| Average PSNR/Average SSIM (Y) | 23.29/ 0.6385 | 27.86/ 0.8237 | 29.63/ 0.8719 | 29.93/ 0.8717 | 28.81/ 0.8546 | 29.89/ 0.84 | 29.74/ 0.8747 | 30.18/ 0.8811 |
| Average PSNR/Average SSIM (RGB channel) | 21.83/ 0.6133 | 26.38/ 0.8072 | 28.10/ 0.8582 | 28.36 /0.8579 | —/— | 27.38/ 0.8365 | 28.12/ 0.8574 | 28.43/ 0.8653 |
| UDM10 | | | | | | | | |
| Flops | N/A | 1.23 | 1.65 | 24.81 | 1.88 | 0.36 | 0.24 | 0.35 |
| Running time [ms] | N/A | 1610 | 1386 | 1531 | 295 | 61 | 13 | 24 |

TABLE 2-continued

| SPMCS | Bicubic | TOFlow | DUF-52L | RBPN | SPMC | FRVSR 10-128 | RLSP 7-256 | RSDN 9-128 (this disclosure) |
|---|---|---|---|---|---|---|---|---|
| Average PSNR/Average SSIM (Y) | 28.47/ 0.8523 | 36.26/ 0.9438 | 38.48/ 0.9605 | 38.66/ 0.9596 | 39.01/ 0.9645 | 37.33/ 0.9518 | 38.48/ 0.9606 | 39.10/ 0.9655 |
| Average PSNR/Average SSIM (RGB channel) Vimeo-90K-T | 27.05/ 0.8267 | 34.46/ 0.9298 | 36.78/ 0.9514 | 36.53/ 0.9462 | 36.91/ 0.9526 | 35.13/ 0.9347 | 36.39/ 0.9465 | 37.15/ 0.9538 |
| Flops | N/A | 0.27 | 0.20 | 3.08 | 0.30 | 0.04 | 0.03 | 0.0.4 |
| Running time [ms] | N/A | 179 | 167 | 192 | 96 | 23 | 9 | 12 |
| Average PSNR/Average SSIM (Y) | 31.30/ 0.8687 | 34.62/ 0.9212 | 36.87/ 0.9447 | 37.20/ 0.9458 | 37.61/ 0.9489 | 35.64/ 0.9319 | 36.27/ 0.9398 | 37.26/ 0.9472 |
| Average PSNR/Average SSIM (RGB channel) | 29.77/ 0.8490 | 32.78/ 0.9040 | 34.96/ 0.9313 | 35.39/ 0.9340 | 35.79/ 0.9374 | 33.96/ 0.9192 | 34.56/ 0.9274 | 35.42/ 0.9347 |

It can be further learned from Table 2 that, in this method, single-frame processing times on three datasets are respectively 18 ms, 24 ms, and 12 ms, and all exceeds 20 frames/second, so that real-time running is achieved, and high efficiency of the image processing method provided in this disclosure is reflected.

Figure 17:
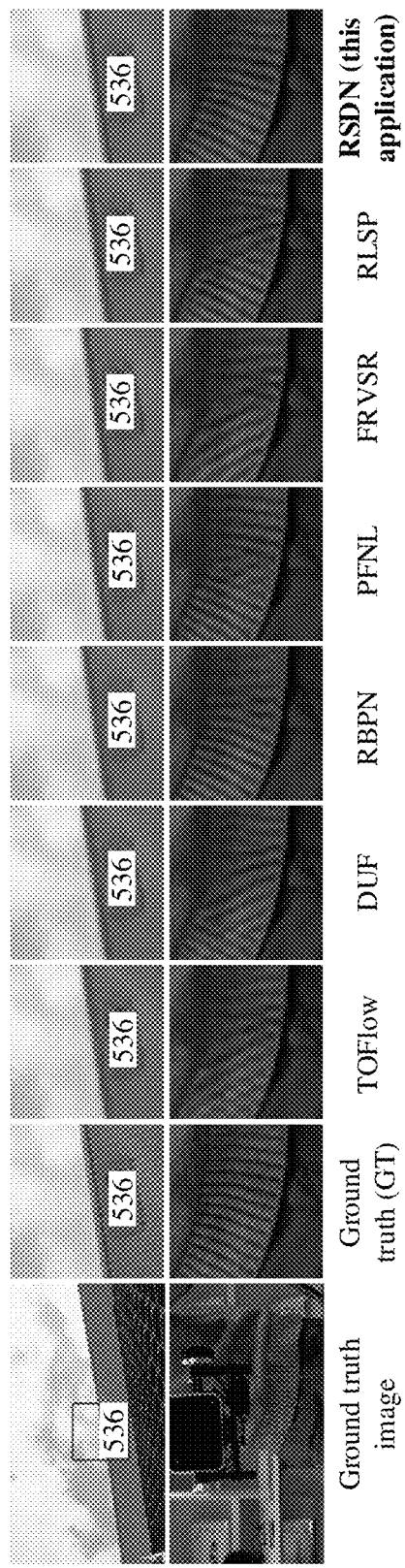
FIG. 17 is a schematic diagram of image processing effect according to an embodiment of this disclosure.

Finally, some image frames of a plurality of test sets are selected for visualization, and performance of different methods is compared in detail. For example, FIG. 17 shows, from an output high-resolution result, leading effect of the method provided in this disclosure in video super-resolution, and a higher-definition image can be obtained.

The image processing methods provided in this disclosure are described in detail above. The following describes an apparatus provided in this disclosure.

Figure 18:
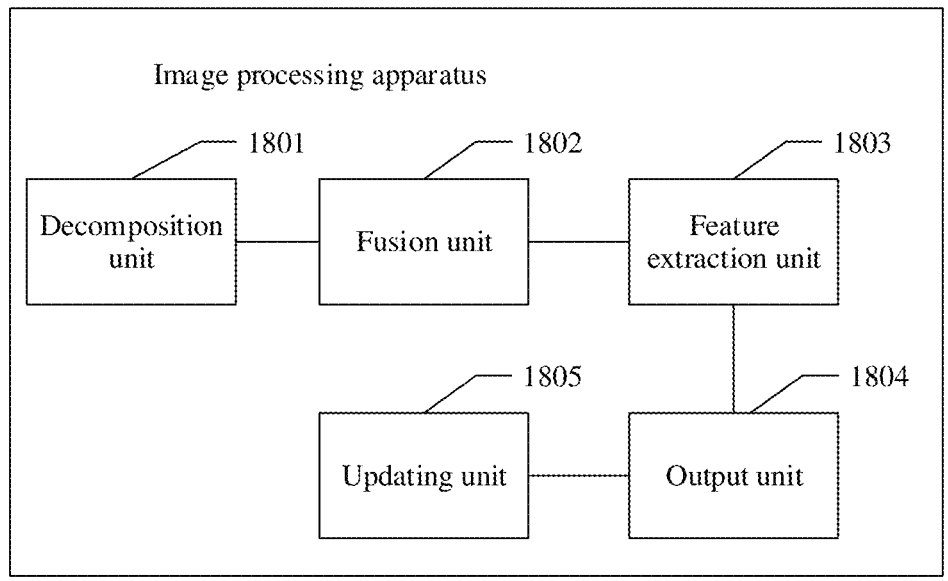
FIG. 18 is a schematic diagram of a structure of an image processing apparatus according to an embodiment of this disclosure.

FIG. 18 is a schematic diagram of a structure of an image processing apparatus according to this disclosure. The image processing apparatus may include:
a decomposition unit 1801, configured to decompose a first image to obtain a first structure sub-image and a first detail sub-image, where the first image is any frame of image in video data other than a first frame, a first frequency is lower than a second frequency, the first frequency is a frequency of information included in the first structure sub-image, and the second frequency is a frequency of information included in the first detail sub-image;
a fusion unit 1802, configured to: fuse first hidden state information and the first structure sub-image to obtain a second structure sub-image, and splice the first hidden state information and the first detail sub-image to obtain a second detail sub-image, where the first hidden state information includes a feature extracted from a second image, and the second image includes at least one frame of image in the video data adjacent to the first image;
a feature extraction unit 1803, configured to perform feature extraction based on the second structure sub-image and the second detail sub-image to obtain a structure feature and a detail feature; and
an output unit 1804, configured to obtain an output image based on the structure feature and the detail feature, where a resolution of the output image is higher than a resolution of the first image.

In a possible implementation, the fusion unit 1802 is specifically configured to: obtain a similarity matrix between the first hidden state information and the first image, where the similarity matrix includes at least one similarity, and the at least one similarity indicates a similarity between an image region included in the first hidden state information and an image region in the first image; filter the first hidden state information based on the similarity matrix to obtain second hidden state information, where a similarity between each image region in the second hidden state information and a corresponding image region in the first image is higher than a similarity between each image region in the first hidden state information and the image region in the first image; and splice the first structure sub-image by using the second hidden state information to obtain the second structure sub-image, and splice the first detail sub-image by using the second hidden state information to obtain the second detail sub-image.

In a possible implementation, the feature extraction unit 1803 is configured to: perform iterative fusion on the second structure sub-image and the second detail sub-image for at least one time to obtain an updated second structure sub-image and an updated second detail sub-image; and extract a feature from the updated second structure sub-image to obtain the structure feature, and extract a feature from the updated second detail sub-image to obtain the detail feature.

In a possible implementation, any iterative fusion process may include: performing fusion on a second structure sub-image obtained in a previous iteration and a second detail sub-image obtained in the previous iteration, to obtain a first fused image of a current iteration; performing fusion on the first fused image and the second structure sub-image obtained in the previous iteration, to obtain a second structure sub-image of the current iteration; and performing fusion on the first fused image and the second detail sub-image obtained in the previous iteration, to obtain a second detail sub-image of the current iteration.

In a possible implementation, the output unit 1804 is specifically configured to: fuse the structure feature and the detail feature to obtain a second fused image; and perform amplification processing on the second fused image to obtain the output image, where the resolution of the output image is higher than the resolution of the second fused image.

In a possible implementation, the image processing apparatus may further include an updating unit 1805, configured to update the first hidden state information based on the structure feature and the detail feature, where the first hidden state information is used to process a next frame of image that is in the video data and that is arranged in the first image.

In a possible implementation, the decomposition unit 1801 is specifically configured to: perform downsampling on the first image to obtain a downsampled image; perform upsampling on the downsampled image to obtain the first structure sub-image; and remove the first structure sub-image from the first image to obtain the first detail sub-image.

Figure 19:
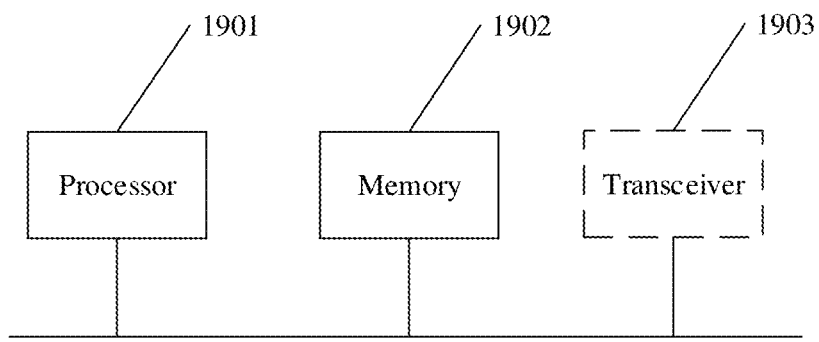
FIG. 19 is a schematic diagram of a structure of another image processing apparatus according to an embodiment of this disclosure.

FIG. 19 is a schematic diagram of a structure of another image processing apparatus according to this disclosure. Details are as follows:

The image processing apparatus may include a processor 1901 and a memory 1902. The processor 1901 and the memory 1902 are interconnected through a line. The memory 1902 stores program instructions and data.

The memory 1902 stores the program instructions and the data that correspond to the steps in FIG. 6 to FIG. 16.

The processor 1901 is configured to perform the method steps performed by the image processing apparatus shown in any one of the embodiments in FIG. 6 to FIG. 16.

Optionally, the image processing apparatus may further include a transceiver 1903, configured to receive or send data.

An embodiment of this disclosure further provides a computer-readable storage medium. The computer-readable storage medium stores a program used to generate a traveling speed of a vehicle. When the program is run on a computer, the computer is enabled to perform the steps in the methods described in the embodiments shown in FIG. 6 to FIG. 16.

Optionally, the image processing apparatus shown in FIG. 19 is a chip.

An embodiment of this disclosure further provides an image processing apparatus. The image processing apparatus may also be referred to as a digital processing chip or a chip. The chip includes a processing unit and a communication interface. The processing unit obtains program instructions through the communication interface, and the program instructions are executed by the processing unit. The processing unit is configured to perform the method steps performed by the image processing apparatus shown in any one of the foregoing embodiments in FIG. 6 to FIG. 16.

An embodiment of this disclosure further provides a digital processing chip. A circuit and one or more interfaces that are configured to implement the processor 1901 or a function of the processor 1901 are integrated into the digital processing chip. When a memory is integrated into the digital processing chip, the digital processing chip may complete the method steps in any one or more of the foregoing embodiments. When a memory is not integrated into the digital processing chip, the digital processing chip may be connected to an external memory through a communication interface. The digital processing chip implements, based on program code stored in the external memory, the actions performed by the image processing apparatus in the foregoing embodiments.

An embodiment of this disclosure further provides a computer program product. When the computer program product runs on a computer, the computer is enabled to perform steps performed by the image processing apparatus in the methods described in the embodiments shown in FIG. 6 to FIG. 16.

The image processing apparatus provided in this embodiment of this disclosure may be a chip. The chip includes a processing unit and a communication unit. The processing unit may be, for example, a processor, and the communication unit may be, for example, an input/output interface, a pin, a circuit, or the like. The processing unit may execute computer-executable instructions stored in a storage unit, so that the chip in a server performs the image processing method described in embodiments shown in FIG. 6 to FIG. 16. Optionally, the storage unit is a storage unit in the chip, for example, a register or a buffer. Alternatively, the storage unit may be a storage unit in a wireless access device but outside the chip, for example, a read-only memory (ROM), another type of static storage device that can store static information and instructions, or a random access memory (RAM).

Specifically, the processing unit or the processor may be a central processing unit (CPU), a network processing unit (NPU), a graphics processing unit (GPU), a digital signal processor (DSP), an application-specific integrated circuit (ASIC), a field programmable gate array (FPGA), another programmable logic device, a discrete gate, a transistor logic device, a discrete hardware component, or the like. The general-purpose processor may be a microprocessor or any regular processor or the like.

Figure 20:
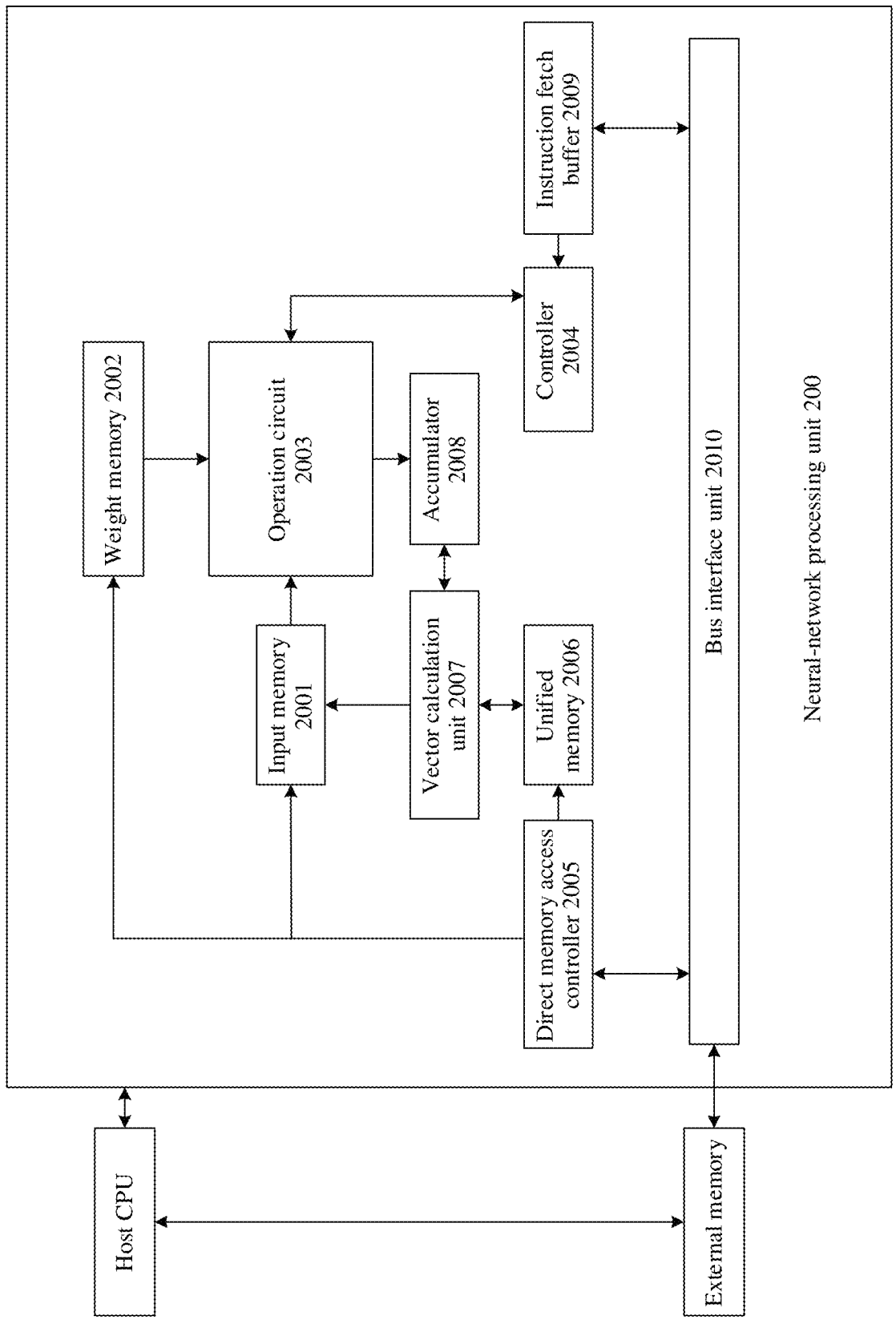
FIG. 20 is a schematic diagram of a structure of a chip according to an embodiment of this disclosure.

For example, refer to FIG. 20. FIG. 20 is a schematic diagram of a structure of a chip according to an embodiment of this disclosure. The chip may be represented as a neural-network processing unit NPU 200. The NPU 200 is mounted to a host CPU as a coprocessor, and the host CPU allocates a task. A core part of the NPU is an operation circuit 2003. The operation circuit 2003 is controlled by a controller 2004 to extract matrix data in a memory and perform a multiplication operation.

In some implementations, the operation circuit 2003 includes a plurality of processing engines (PEs). In some implementations, the operation circuit 2003 is a two-dimensional systolic array. The operation circuit 2003 may alternatively be a one-dimensional systolic array or another electronic circuit that can perform mathematical operations such as multiplication and addition. In some implementations, the operation circuit 2003 is a general-purpose matrix processor.

For example, it is assumed that there are an input matrix A, a weight matrix B, and an output matrix C. The operation circuit fetches data corresponding to the matrix B from a weight memory 2002, and buffers the data on each PE in the operation circuit. The operation circuit fetches data of the matrix A from an input memory 2001, to perform a matrix operation on the matrix B, and stores an obtained partial result or an obtained final result of the matrix into an accumulator 2008.

A unified memory 2006 is configured to store input data and output data. Weight data is directly transferred to the weight memory 2002 through a direct memory access controller (DMAC) 2005. The input data is also transferred to the unified memory 2006 through the DMAC.

A bus interface unit (BIU) 2010 is used for interaction between an AXI bus and the DMAC and between the AXI bus and an instruction fetch buffer (IFB) 2009.

The bus interface unit (BIU) 2010 is used by the instruction fetch buffer 2009 to obtain instructions from an external memory, and is further used by the direct memory access controller 2005 to obtain original data of the input matrix A or the weight matrix B from the external memory.

The DMAC is mainly configured to transfer input data in the external memory DDR to the unified memory 2006, transfer the weight data to the weight memory 2002, or transfer the input data to the input memory 2001.

A vector calculation unit 2007 includes a plurality of operation processing units. If required, further processing is performed on an output of the operation circuit, for example, vector multiplication, vector addition, an exponential operation, a logarithmic operation, or size comparison. The vector calculation unit 2007 is mainly configured to perform network calculation at a non-convolutional/fully connected layer in a neural network, for example, batch normalization, pixel-level summation, and upsampling on a feature plane.

In some implementations, the vector calculation unit 2007 can store a processed output vector in the unified memory 2006. For example, the vector calculation unit 2007 may apply a linear function or a non-linear function to the output of the operation circuit 2003, for example, perform linear interpolation on a feature plane extracted at a convolutional layer. For another example, the linear function or the non-linear function is applied to a vector of an accumulated value to generate an activation value. In some implementations, the vector calculation unit 2007 generates a normalized value, a pixel-level summation value, or a normalized value and a pixel-level summation value. In some implementations, the processed output vector can be used as an activation input of the operation circuit 2003, for example, to be used in a subsequent layer in the neural network.

The instruction fetch buffer 2009 connected to the controller 2004 is configured to store instructions used by the controller 2004.

The unified memory 2006, the input memory 2001, the weight memory 2002, and the instruction fetch buffer 2009 are all on-chip memories. The external memory is private for a hardware architecture of the NPU.

An operation at each layer in a recurrent neural network may be performed by the operation circuit 2003 or the vector calculation unit 2007.

The processor mentioned above may be a general-purpose central processing unit, a microprocessor, an ASIC, or one or more integrated circuits for controlling program execution of the methods in FIG. 6 to FIG. 16.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected based on actual needs to achieve the objectives of the solutions of embodiments. In addition, in the accompanying drawings of the apparatus embodiments provided by this disclosure, connection relationships between modules indicate that the modules have communication connections with each other, which may be specifically implemented as one or more communication buses or signal cables.

Based on the descriptions of the foregoing implementations, a person skilled in the art may clearly understand that this disclosure may be implemented by software in addition to necessary universal hardware, or by dedicated hardware, including an application-specific integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this disclosure, software program implementation is a better implementation in most cases. Based on such an understanding, the technical solutions of this disclosure essentially or the part contributing to the conventional technology may be implemented in a form of a computer software product. The computer software product is stored in a readable storage medium, for example, a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in embodiments of this disclosure.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer instructions are loaded and executed on a computer, the procedures or functions according to embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

In the specification, claims, and accompanying drawings of this disclosure, the terms "first", "second", "third", "fourth", and so on (if existent) are intended to distinguish between similar objects but do not necessarily indicate a specific order or sequence. It should be understood that the data termed in such a way is interchangeable in proper circumstances so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Finally, it should be noted that the foregoing descriptions are merely specific implementations of this disclosure, but the protection scope of this disclosure is not limited thereto. Any variation or replacement readily figured out by a person skilled in the art within the technical scope disclosed in this disclosure shall fall within the protection scope of this disclosure. Therefore, the protection scope of this disclosure shall be subject to the protection scope of the claims.

The invention claimed is:

1. An image processing method comprising:
   decomposing a first image to obtain a first structure sub-image and a first detail sub-image, wherein the first image is any frame of image in video data other than a first frame, a first frequency is lower than a second frequency, the first frequency is a frequency of information comprised in the first structure sub-image, and the second frequency is a frequency of information comprised in the first detail sub-image;
   fusing first hidden state information and the first structure sub-image to obtain a second structure sub-image, and splicing the first hidden state information and the first detail sub-image to obtain a second detail sub-image, wherein the first hidden state information comprises a feature extracted from a second image, and the second image comprises at least one frame of image in the video data adjacent to the first image;
   performing feature extraction based on the second structure sub-image and the second detail sub-image, to obtain a structure feature and a detail feature; and
   obtaining an output image based on the obtained structure feature and the obtained detail feature, so that a resolution of the output image is higher than a resolution of the first image.

2. The method according to claim 1, wherein the fusing first hidden state information and the first structure sub-image to obtain a second structure sub-image, and splicing the first hidden state information and the first detail sub-image to obtain a second detail sub-image comprises:
   obtaining a similarity matrix between the first hidden state information and the first image, wherein the similarity matrix comprises at least one similarity score indicating a degree of similarity between an image region comprised in the first hidden state information and an image region in the first image;
   filtering the first hidden state information based on the similarity matrix to obtain second hidden state information, wherein a degree of similarity between each image region in the second hidden state information and a corresponding image region in the first image is higher than a degree of similarity between each image region in the first hidden state information and the image region in the first image; and
   splicing the first structure sub-image by using the second hidden state information to obtain the second structure sub-image, and splicing the first detail sub-image by using the second hidden state information to obtain the second detail sub-image.

3. The method according to claim 1, wherein the performing feature extraction based on the second structure sub-image and the second detail sub-image to obtain a structure feature and a detail feature comprises:
   iteratively performing a fusion process on the second structure sub-image and the second detail sub-image to obtain an updated second structure sub-image and an updated second detail sub-image; and
   extracting a feature from the updated second structure sub-image to obtain the structure feature, and extracting a feature from the updated second detail sub-image to obtain the detail feature.

4. The method according to claim 3, wherein the fusion process comprises:
   performing fusion on a second structure sub-image obtained in a previous iteration and a second detail sub-image obtained in the previous iteration, to obtain a first fused image of a current iteration;
   performing fusion on the first fused image and the second structure sub-image obtained in the previous iteration, to obtain a second structure sub-image of the current iteration; and
   performing fusion on the first fused image and the second detail sub-image obtained in the previous iteration, to obtain a second detail sub-image of the current iteration.

5. The method according to claim 1, wherein the obtaining an output image based on the obtained structure feature and the obtained detail feature comprises:
   fusing the structure feature and the detail feature to obtain a second fused image; and
   performing amplification processing on the second fused image to obtain the output image, wherein the resolution of the output image is higher than a resolution of the second fused image.

6. The method according to claim 1, wherein after the extracting a feature from the second structure sub-image to obtain the structure feature, and extracting a feature from the second detail sub-image to obtain the detail feature, the method further comprises:
   updating the first hidden state information based on the structure feature and the detail feature, wherein a next frame of image in the video data is processed using the first hidden state information and the next frame of image is arranged in the first image.

7. The method according to claim 1, wherein the decomposing a first image comprises:
   performing downsampling on the first image to obtain a downsampled image;
   performing upsampling on the downsampled image to obtain the first structure sub-image; and
   removing the first structure sub-image from the first image to obtain the first detail sub-image.

8. An image processing apparatus comprising at least one processor coupled to a memory, wherein the memory stores a program including instructions that, when executed by the at least one processor, cause the image processing apparatus to perform operations comprising:
   decomposing a first image to obtain a first structure sub-image and a first detail sub-image, wherein the first image is any frame of image in video data other than a first frame, a first frequency is lower than a second frequency, the first frequency is a frequency of information comprised in the first structure sub-image, and the second frequency is a frequency of information comprised in the first detail sub-image;
   fusing first hidden state information and the first structure sub-image to obtain a second structure sub-image, and splicing the first hidden state information and the first detail sub-image to obtain a second detail sub-image, wherein the first hidden state information comprises a feature extracted from a second image, and the second image comprises at least one frame of image in the video data adjacent to the first image;
   performing feature extraction based on the second structure sub-image and the second detail sub-image, to obtain a structure feature and a detail feature; and
   obtaining an output image based on the obtained structure feature and the obtained detail feature, so that a resolution of the output image is higher than a resolution of the first image.

9. The apparatus according to claim 8, wherein the fusing first hidden state information and the first structure sub-image to obtain a second structure sub-image, and splicing the first hidden state information and the first detail sub-image to obtain a second detail sub-image comprises:

obtaining a similarity matrix between the first hidden state information and the first image, wherein the similarity matrix comprises at least one similarity score indicating a degree of similarity between an image region comprised in the first hidden state information and an image region in the first image;

filtering the first hidden state information based on the similarity matrix to obtain second hidden state information, wherein a degree of similarity between each image region in the second hidden state information and a corresponding image region in the first image is higher than a degree of similarity between each image region in the first hidden state information and the image region in the first image; and splicing the first structure sub-image by using the second hidden state information to obtain the second structure sub-image, and splicing the first detail sub-image by using the second hidden state information to obtain the second detail sub-image.

10. The apparatus according to claim 8, wherein the performing feature extraction based on the second structure sub-image and the second detail sub-image to obtain a structure feature and a detail feature comprises:

iteratively performing a fusion process on the second structure sub-image and the second detail sub-image to obtain an updated second structure sub-image and an updated second detail sub-image; and extracting a feature from the updated second structure sub-image to obtain the structure feature, and extracting a feature from the updated second detail sub-image to obtain the detail feature.

11. The apparatus according to claim 10, wherein the fusion process comprises:

performing fusion on a second structure sub-image obtained in a previous iteration and a second detail sub-image obtained in the previous iteration, to obtain a first fused image of a current iteration;

performing fusion on the first fused image and the second structure sub-image obtained in the previous iteration, to obtain a second structure sub-image of the current iteration; and performing fusion on the first fused image and the second detail sub-image obtained in the previous iteration, to obtain a second detail sub-image of the current iteration.

12. The apparatus according to claim 8, wherein the obtaining an output image based on the obtained structure feature and the obtained detail feature comprises:

fusing the structure feature and the detail feature to obtain a second fused image; and performing amplification processing on the second fused image to obtain the output image, wherein the resolution of the output image is higher than a resolution of the second fused image.

13. The apparatus according to claim 8, wherein after the extracting a feature from the second structure sub-image to obtain the structure feature, and extracting a feature from the second detail sub-image to obtain the detail feature, the operations further comprise:

updating the first hidden state information based on the structure feature and the detail feature, wherein a next frame of image in the video data is processed using the first hidden state information and the next frame of image is arranged in the first image.

14. The apparatus according to claim 8, wherein the decomposing a first image comprises:

performing downsampling on the first image to obtain a downsampled image;

performing upsampling on the downsampled image to obtain the first structure sub-image; and removing the first structure sub-image from the first image to obtain the first detail sub-image.

15. A non-transitory machine-readable storage medium storing instructions that, when executed by at least one processor, cause the at least one processor to perform operations comprising:

decomposing a first image to obtain a first structure sub-image and a first detail sub-image, wherein the first image is any frame of image in video data other than a first frame, a first frequency is lower than a second frequency, the first frequency is a frequency of information comprised in the first structure sub-image, and the second frequency is a frequency of information comprised in the first detail sub-image;

fusing first hidden state information and the first structure sub-image to obtain a second structure sub-image, and splicing the first hidden state information and the first detail sub-image to obtain a second detail sub-image, wherein the first hidden state information comprises a feature extracted from a second image, and the second image comprises at least one frame of image in the video data adjacent to the first image;

performing feature extraction based on the second structure sub-image and the second detail sub-image, to obtain a structure feature and a detail feature; and obtaining an output image based on the obtained structure feature and the obtained detail feature, so that a resolution of the output image is higher than a resolution of the first image.

16. The non-transitory machine-readable storage medium according to claim 15, wherein the fusing first hidden state information and the first structure sub-image to obtain a second structure sub-image, and splicing the first hidden state information and the first detail sub-image to obtain a second detail sub-image comprises:

obtaining a similarity matrix between the first hidden state information and the first image, wherein the similarity matrix comprises at least one similarity score indicating a degree of similarity between an image region comprised in the first hidden state information and an image region in the first image;

filtering the first hidden state information based on the similarity matrix to obtain second hidden state information, wherein a degree of similarity between each image region in the second hidden state information and a corresponding image region in the first image is higher than a degree of similarity between each image region in the first hidden state information and the image region in the first image; and splicing the first structure sub-image by using the second hidden state information to obtain the second structure sub-image, and splicing the first detail sub-image by using the second hidden state information to obtain the second detail sub-image.

17. The non-transitory machine-readable storage medium according to claim 15, wherein the performing feature extraction based on the second structure sub-image and the second detail sub-image to obtain a structure feature and a detail feature comprises:

iteratively performing a fusion process on the second structure sub-image and the second detail sub-image to obtain an updated second structure sub-image and an updated second detail sub-image; and extracting a feature from the updated second structure sub-image to obtain the structure feature, and extracting a feature from the updated second detail sub-image to obtain the detail feature.

18. The non-transitory machine-readable storage medium according to claim 17, wherein the fusion process comprises:

performing fusion on a second structure sub-image obtained in a previous iteration and a second detail sub-image obtained in the previous iteration, to obtain a first fused image of a current iteration;

performing fusion on the first fused image and the second structure sub-image obtained in the previous iteration, to obtain a second structure sub-image of the current iteration; and performing fusion on the first fused image and the second detail sub-image obtained in the previous iteration, to obtain a second detail sub-image of the current iteration.

19. The non-transitory machine-readable storage medium according to claim 15, wherein the obtaining an output image based on the obtained structure feature and the obtained detail feature comprises:

fusing the structure feature and the detail feature to obtain a second fused image; and performing amplification processing on the second fused image to obtain the output image, wherein the resolution of the output image is higher than a resolution of the second fused image.

20. The non-transitory machine-readable storage medium according to claim 15, wherein after the extracting a feature from the second structure sub-image to obtain the structure feature, and extracting a feature from the second detail sub-image to obtain the detail feature, the operations further comprise:

updating the first hidden state information based on the structure feature and the detail feature, wherein a next frame of image in the video data is processed using the first hidden state information and the next frame of image is arranged in the first image.

* * * * *